(12) United States Patent
Rao

(10) Patent No.: US 11,593,181 B2
(45) Date of Patent: *Feb. 28, 2023

(54) STATELESS CONTENT MANAGEMENT SYSTEM

(71) Applicant: Open Text Corporation, Waterloo (CA)

(72) Inventor: Raghavendra Anantha Rao, Pleasanton, CA (US)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/146,240

(22) Filed: Jan. 11, 2021

(65) Prior Publication Data

US 2021/0133003 A1 May 6, 2021

Related U.S. Application Data

(63) Continuation of application No. 16/138,623, filed on Sep. 21, 2018, now Pat. No. 10,896,070.

(Continued)

(51) Int. Cl.
*G06F 9/455* (2018.01)
*G06F 9/50* (2006.01)
(Continued)

(52) U.S. Cl.
CPC .............. *G06F 9/5077* (2013.01); *G06F 8/52* (2013.01); *G06F 8/656* (2018.02); *G06F 8/71* (2013.01);
(Continued)

(58) Field of Classification Search
CPC .......... G06F 9/5077; G06F 8/656; G06F 8/52; G06F 8/71; G06F 9/45558; G06F 9/505; G06F 9/54; G06F 11/3476
See application file for complete search history.

(56) References Cited

U.S. PATENT DOCUMENTS 7,137,139 B1 11/2006 Smith
8,793,371 B1 * 7/2014 Nanekar ............. H04L 67/1097
709/224

(Continued)

OTHER PUBLICATIONS

Office Action for U.S. Appl. No. 13/430,943, dated May 1, 2015, 17 pgs.

(Continued)

*Primary Examiner* — Hang Pan
(74) *Attorney, Agent, or Firm* — Sprinkle IP Law Group

(57) ABSTRACT

One embodiment comprises a stateless container of binaries and a broker. The stateless container of binaries includes a code memory having stored thereon code for a first version of a first functional component of a content management system, the first functional component executable to provide a first version of a service. The broker may be executable to: receive a request for the service from a client application, the request associated with a user of the content management system; determine that the first version of the service is accessible with regard to the user; determine an available first server that hosts the first version of the service; provide an indication of the first version of the service to the client application; and provide an IP address and a port number associated with the available first server to the client application.

24 Claims, 17 Drawing Sheets

Related U.S. Application Data

(60) Provisional application No. 62/562,129, filed on Sep. 22, 2017.

(51) Int. Cl.
*G06F 8/52* (2018.01)
*G06F 8/71* (2018.01)
*G06F 11/34* (2006.01)
*G06F 9/54* (2006.01)
*G06F 8/656* (2018.01)

(52) U.S. Cl.
CPC .......... *G06F 9/45558* (2013.01); *G06F 9/505* (2013.01); *G06F 9/54* (2013.01); *G06F 11/3476* (2013.01)

(56) References Cited

U.S. PATENT DOCUMENTS

| | | |
|---|---|---|
| 9,083,579 B1 | 7/2015 | Kaushik et al. |
| 9,648,138 B1 | 5/2017 | Wei et al. |
| 9,686,208 B2 | 6/2017 | Kaushik et al. |
| 9,853,912 B2 | 12/2017 | Kaushik et al. |
| 10,063,418 B2 | 8/2018 | Wei et al. |
| 10,749,750 B2 | 8/2020 | Wei et al. |
| 10,896,070 B2 | 1/2021 | Rao |
| 11,196,626 B2 | 12/2021 | Wei et al. |
| 2002/0037735 A1 | 3/2002 | Maggenti et al. |
| 2002/0102999 A1 | 8/2002 | Maggenti et al. |
| 2003/0033362 A1 | 2/2003 | King et al. |
| 2006/0069780 A1 | 3/2006 | Batni et al. |
| 2006/0156157 A1* | 7/2006 | Haselden ............ G06F 11/0793 714/746 |
| 2007/0061327 A1 | 3/2007 | Oscherov |
| 2008/0148083 A1 | 6/2008 | Pesavento et al. |
| 2009/0006884 A1 | 1/2009 | Cahill et al. |
| 2009/0113058 A1 | 4/2009 | Ou et al. |
| 2009/0241176 A1 | 9/2009 | Beletski et al. |
| 2010/0058093 A1 | 3/2010 | Danieli et al. |
| 2010/0138558 A1* | 6/2010 | Chen ..................... G06F 16/958 709/242 |
| 2010/0153524 A1 | 6/2010 | Rehm et al. |
| 2010/0185902 A1* | 7/2010 | Fang ....................... H04L 67/02 714/48 |
| 2010/0218005 A1 | 8/2010 | Jain et al. |
| 2010/0251335 A1* | 9/2010 | Srisuresh ................ H04L 12/66 726/13 |
| 2011/0161957 A1 | 6/2011 | Bernardi et al. |
| 2012/0084560 A1 | 4/2012 | Jayaraman |
| 2012/0159523 A1* | 6/2012 | Kulkarni ............... G06F 9/5061 719/328 |
| 2014/0173130 A1* | 6/2014 | Uluderya ............... G06F 9/5055 709/238 |
| 2014/0258984 A1 | 9/2014 | Kramer |
| 2015/0163327 A1* | 6/2015 | Bolton .................... H04L 67/42 709/224 |
| 2017/0244605 A1 | 8/2017 | Wei et al. |
| 2019/0042321 A1* | 2/2019 | Venkatesh .......... G06F 9/45558 |
| 2019/0042322 A1* | 2/2019 | Calhoun ............... G06F 9/5072 |
| 2019/0095254 A1 | 3/2019 | Rao |
| 2020/0351166 A1 | 11/2020 | Wei |
| 2022/0060381 A1 | 2/2022 | Wei et al. |

OTHER PUBLICATIONS

Office Action for U.S. Appl. No. 13/430,943, dated Oct. 6, 2015, 19 pgs.
Office Action for U.S. Appl. No. 13/430,943, dated Mar. 14, 2016, 21 pgs.
Office Action for U.S. Appl. No. 13/430,943, dated Aug. 19, 2016, 21 pgs.
Office Action for U.S. Appl. No. 15/588,276, dated Jul. 21, 2017, 19 pgs.
Office Action for U.S. Appl. No. 15/588,276, dated Nov. 13, 2017, 7 pgs.
Office Action for U.S. Appl. No. 16/037,921, dated Apr. 8, 2019, 7 pgs.
Office Action for U.S. Appl. No. 16/037,921, dated Jul. 26, 2019, 12 pgs.
Office Action for U.S. Appl. No. 16/037,921, dated Dec. 31, 2019, 8 pgs.
Office Action for U.S. Appl. No. 16/138,623, dated Apr. 9, 2020, 10 pgs.
Notice of Allowance for U.S. Appl. No. 16/138,623, dated Aug. 25, 2020, 9 pgs.
Notice of Allowance for U.S. Appl. No. 16/929,950, dated Aug. 6, 2021, 4 pgs.

* cited by examiner

FIG. 11A

```
E:\Documentum\product\7.x\bin>dmqdocbroker -c getdocbasemap
dmqdocbroker: A DocBroker Query Tool
dmqdocbroker: Documentum Client Library Version: 7.1.0000.0118
Targeting current host
Targeting port 1489
********************************************
**    D O C B R O K E R   I N F O    **
********************************************
Docbroker host          : ContentServer
Docbroker port          : 1490
Docbroker network address   : INET_ADDR: 02 5d2 c0a80a0d
ContentServer 192.168.10.13
Docbroker version       : 7.x.0000.0151 Win64
********************************************
**    D O C B A S E   I N F O    **
********************************************
--------------------------------------------
Docbase name            : winsql
Docbase id              : 1235
Docbase description     : winsql
Govern docbase          :
Federation name         :
Server version          : 7.x.0000.0151 Win64.SQLServer
Docbase Roles           : Global Registry
Docbase Dormancy Status :
--------------------------------------------
Docbase name            : winsql2
Docbase id              : 12354
Docbase description     : winsql2
Govern docbase          :
Federation name         :
Server version          : 7.x.0000.0151 Win64.SQLServer
Docbase Roles           :
Docbase Dormancy Status :
--------------------------------------------
Docbase name            : winsql3
Docbase id              : 13355
Docbase description     : winsql3
Govern docbase          :
Federation name         :
Server version          : 7.x.0000.0151 Win64.SQLServer
Docbase Roles           :
Docbase Dormancy Status :
--------------------------------------------
```

```
E:\Documentum\product\7.x\bin>dmqdocbroker -c getservermap winsql2
dmqdocbroker: A DocBroker Query Tool
dmqdocbroker: Documentum Client Library Version: 7.1.0000.0118
Targeting current host
Targeting port 1489
*********************************************
**   D O C B R O K E R    I N F O    **
*********************************************
Docbroker host        : ContentServer
Docbroker port        : 1490
Docbroker network address    : INET_ADDR: 02 5d2 c0a80a0d ContentServer
192.168.10.13
Docbroker version     : 7.x.0000.0151 Win64
*********************************************
**        S E R V E R    M A P        **
*********************************************
Docbase winsql2 has 1 servers:
---------------------------------------------
  server name    : winsql2
  server host    : ContentServer
  server status  : Open
  client proximity        : 1
  server version: 7.x.0000.0151 Win64.SQLServer
  server process id    : 496
  last ckpt time : 5/9/2017 12:30:44 PM
  next ckpt time : 5/9/2017 12:35:44 PM
  connect protocol    : TCP_RPC
  connection addr      : INET_ADDR: 02 ba0b c0a80a0d  Content Server
192.168910.13 keep entry interval   : 1440
  docbase id    :12354
  server dormancy status        : Active
---------------------------------------------
E:\Documentum\product\7.x\bin>
```

Label: 1018

FIG. 11B

```
Format:
HOST='INTERNAL_IP=EXTERNAL_IP,INT2=EXT2,INT3=EXT3'

Sample:
HOST='10.0.01=172.214.1.100,10.0.0.2=172.200.1.200,10.0.0.3=172.300.2.200'

Sample2:
HOST-'10.0.0.1=172.214.1.100,10.0.0.2=172.214.1.100,10.0.0.3=172.214.1.100'

Port mapping format:
PORT='INTERNAL=EXTERNAL'

Sample:
PORT='1480=8080'
```
1050

FIG. 12

STATELESS CONTENT MANAGEMENT SYSTEM

RELATED APPLICATIONS

This application is a continuation of, and claims a benefit of priority under 35 U.S.C. 120 of U.S. patent application Ser. No. 16/138,623 filed Sep. 21, 2018, issued as U.S. Pat. No. 10,896,070, entitled "Stateless Content Management System," which claims priority under 35 U.S.C. § 119(e) to U.S. Provisional Application No. 62/562,129 filed Sep. 22, 2017, entitled "Stateless Content Management System," which are fully incorporated herein by reference for all purposes.

TECHNICAL FIELD

This disclosure relates generally to the field of content management. More specifically, the disclosure relates to a system and method for managing continuous automated deployment of system components of a content management system.

BACKGROUND

With the ever increasing prevalence and proliferation of electronic content has come a commensurate need for the management of such content. Content management systems do just that, allowing for the management of such content by controlling the access, editing, updating, versioning, etc. of content. This type of content management is in no way trivial. In certain contexts, such as in an enterprise setting, there may be millions or even billions of documents that need to be managed, and users may desire to have access to these documents from a variety of distributed access points.

To facilitate content management in conjunction with such distributed access, content management systems may be organized around one or more content management servers that provide services associated with the management of such content. An enterprise content management system may have a large number of servers running to provide the services of the content management system.

A content management system may need to be updated, for example, as an enterprise's needs change. Such updates may involve revisions to the configuration of functionality running to handle various services and/or other components of the content management system. Updates can require shutting down the system while old versions are removed and new versions are installed, tested, and activated.

The binaries and configuration for each software component of a content management system are often installed together in a single installation. Since data is co-located with binaries in these systems, the system as a whole is backed up and managed, leading to complications when part of the system is to be maintained in isolation to other components. Due to the complex nature of this organization of data and configuration, backup/restore has become complicated and bulky.

Change management is also complicated because any configuration change has to be replicated to all running instances independently. For example, logs may need to be distributed and change sequences derived out of the logs to commit changes. Deriving a sequence out of the distributed logs may be complicated due to inherent buffering and time differences in the systems. Further, a change may need to be transactional. Frequently, systems have to be put in standby or offline mode to ensure that the change is transactional, causing large maintenance cycles during which the system is unusable for users. Moreover, when a system fails, all the data/configuration on it may become inconsistent and potentially lost. Update operations to return the system to an operational state may be very expensive in terms of time offline, time for administrators and technicians to install and test, and in terms of other resources.

SUMMARY

Embodiments described herein provide systems and methods for stateless content management. One embodiment comprises a processor, a plurality of stateless containers of binaries, each of the stateless containers of binaries comprising a code memory having stored thereon processor-executable instructions configured to provide a different version of a first functional component of the content management system, a configuration container comprising a configuration memory having stored thereon configuration data for the plurality of stateless containers of binaries and a data container comprising a data memory storing input data or output data for the plurality of stateless containers of binaries. According to one embodiment, the content management system provides the different versions of the first functional component concurrently.

In one embodiment, each of the stateless containers of binaries is linked to the configuration container and each of the stateless containers of binaries is configured to execute the respective instructions to provide the respective different version of the first functional component and use the configuration data in common and the data memory in common. In one embodiment, each of the plurality of stateless containers of binaries is configured to launch the respective different version of the first functional component in a dormant state. Further, in one embodiment, each of the stateless containers of binaries is configured to use a host operating system in common with the others of the stateless containers of binaries.

According to one embodiment, the configuration data includes one or more initialization parameters for the first functional component. The configuration data may be configured to cause each of the different versions of the first functional component to project an operational status to a common broker that maintains a service registry for the content management system.

The content management system may further comprise a mapping memory having stored thereon mapping data that maps internal IP addresses of the plurality of stateless containers of binaries to corresponding external IP addresses that are accessible to external users of the content management system and status data that indicates a current operational status of each of the different versions of the first functional component. The mapping memory may have stored thereon indicators of access permissions of specified users for accessing one or more of the different versions based on an operational mode of the one or more different versions. The indicators of access permissions may indicate a first level of access for a first user to a first version of the functional component and a second level of access for the first user to a second version of the functional component.

The content management system further comprises instructions executable to provide a broker configured to receive a request for a service of the content management system from a client application, the request associated with a user of the content management system, determine one or more versions of the service, that are determined as accessible, with regard to the user, provide, to the client application, a list of the one or more versions of the service, provide, to the client, a list of one or more servers hosting the one or more versions, the list including an IP address and a port number associated with each of the one or more servers. Each of the versions of the service may be provided by a respective one of the plurality of stateless containers of binaries.

One embodiment includes a computer program product comprising a non-transitory computer readable storage medium storing computer-executable code comprising code for a plurality of stateless containers of binaries, each of the each of a plurality of stateless containers of binaries comprising computer-executable instructions configured to provide a different version of a functional component of a content management system and instructions executable to link each of the stateless containers of binaries to a configuration container storing configuration data for the plurality of stateless containers of binaries and a data container configured to store output data for the plurality of stateless containers of binaries. The code for the plurality of stateless containers of binaries can be executable to provide the different versions of the first functional component concurrently. Each of the plurality of stateless containers of binaries can be configured to launch the respective different version of the first functional component in a dormant state. Each of the plurality of stateless containers of binaries can be configured to use a host operating system in common with the others of the plurality of the stateless containers of binaries.

Each of the plurality of stateless containers of binaries is configured to execute the respective computer-executable instructions to provide the respective different version of the functional component and use the configuration data in common and the data memory in common with the others of the plurality of stateless containers of binaries. According to one embodiment, the configuration data includes one or more initialization parameters for the first functional component. In one embodiment, the configuration data is configured to cause each of the different versions of the first functional component to project an operational status to a common broker that maintains a service registry for the content management system.

The computer-executable code further comprises, in one embodiment, instructions executable to configure a mapping memory with mapping data mapping internal IP addresses of the plurality of stateless containers of binaries to corresponding external IP addresses that are accessible to external users of the content management system and status data that indicates a current operational status of each of the different versions of the first functional component. The computer-executable code may further comprise instructions executable to configure the mapping memory with indicators of access permissions of specified users for accessing one or more of the different versions based on an operational mode of the one or more different versions. The indicators of access permissions, according to one embodiment, indicate a first level of access for a first user to a first version of the functional component and a second level of access for the first user to a second version of the functional component.

According to one embodiment, the computer-executable code further comprises instructions executable to receive a request for a service of the content management system from a client application, the request associated with a user of the content management system; determine one or more versions of the service, that are determined as accessible, with regard to the user; provide, to the client application, a list of the one or more versions of the service; provide, to the client, a list of one or more servers hosting the one or more versions, the list including an IP address and a port number associated with each of the one or more servers. Each of the versions of the service may be provided by a respective one of the plurality of stateless containers of binaries.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 11A and FIG. 11B illustrate example broker maps, according to some embodiments.

FIG. 12 illustrates an example format of a broker map that maps internal to external addresses.

DETAILED DISCLOSURE

Figure 1:
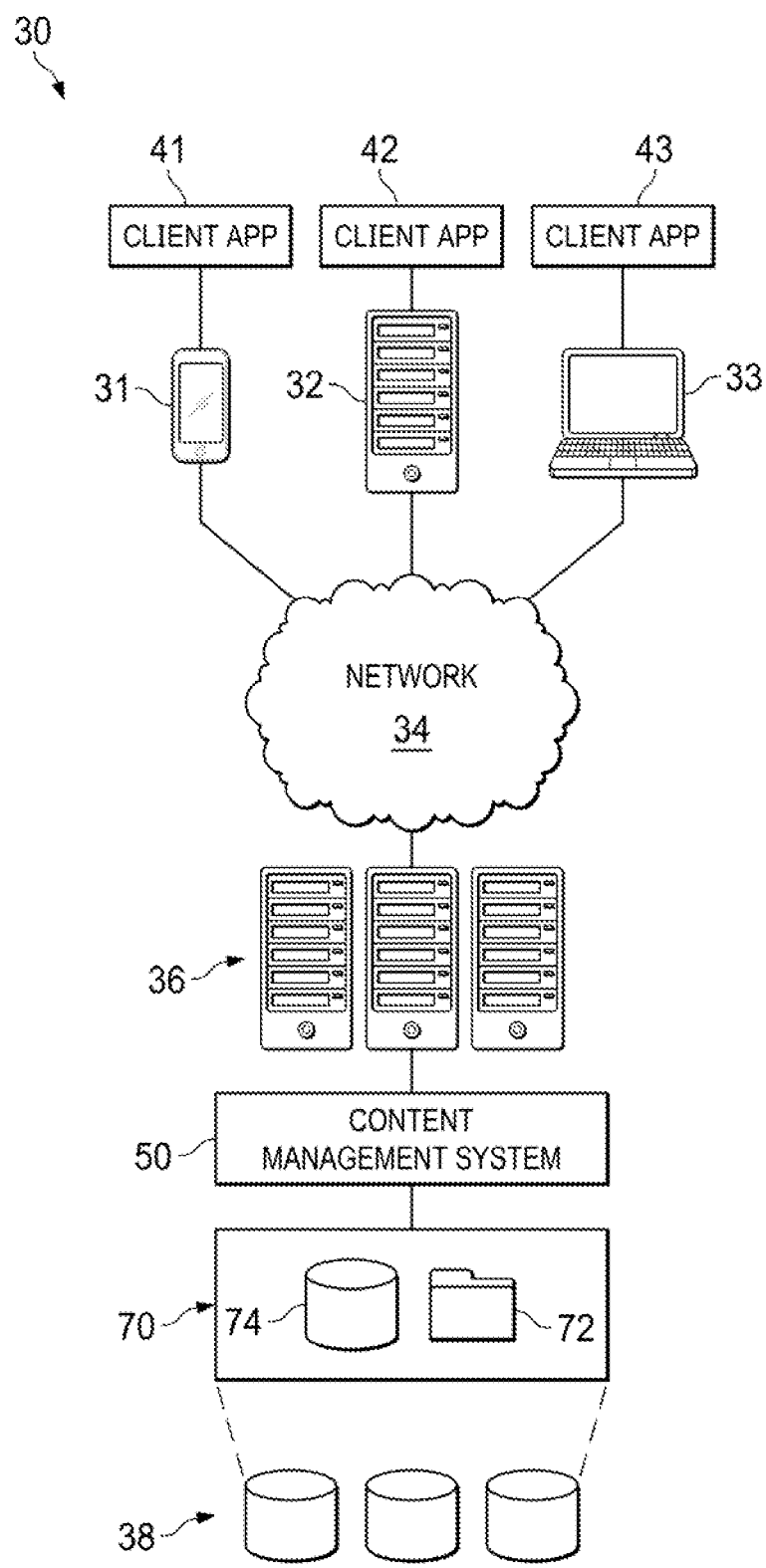
FIG. 1 is a block diagram illustrating one embodiment of one embodiment of a distributed computing system providing one embodiment of a content management system.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

This disclosure provides systems and methods for providing a software-based system that allows seamless updates and changes to the system. In accordance with example techniques discussed herein, binary runtime environments for system components may be located in isolation from the configuration data used to configure the components and output data produced by the components. In particular, stateless containers may be used to implement various components of the system. Such a "stateless" system may enable efficient upgrades and downgrades of binaries. Further, since the configuration and output data can be maintained in separate containers from the binaries that use the configuration or produce the output, the binaries may be managed independently, and multiple binary runtime environments may utilize the same data and configuration. Using these techniques, modifications to the system may be accomplished more quickly, since a single update to a configuration can affect all the runtime containers based out of the configuration container.

Among other advantages and benefits, stateless components can allow a user to seamlessly upgrade various portions of a content management system. Moreover, roll back of a configuration may be performed at centralized container level to affect all the running binary containers for a component. Thus, configuration updates and roll backs may be transactional and more efficient.

Additionally, logs may be stored in a centralized container, making aggregation of logs and sequencing very straightforward and more efficient. Due to the distributed nature of the components, none of the components is a single point of failure, and the system can easily replace failed components.

Some embodiments provide an ability to have multiple versions of a component running concurrently. Example techniques discussed herein may therefore advantageously provide a system that can comprise multiple running releases. According to one embodiment, a common configuration container is used in common by the multiple versions of a component. Embodiments can provide centralized routing of users to appropriate containers for various versions that particular users are entitled to access. Further, embodiments can support a dormancy mode so that operations on various versions may be limited, as needed or desired.

Older and newer component versions may have different schema and other representations in the common configuration and common data. Components may be configured to newer configuration settings and new schema attributes. For example, only newer components may look for the newer attributes and newer behavior. Thus, older systems may encounter the newer configuration settings and new schema attributes, and may continue execution with the old behavior without aborting or calling out error conditions.

In accordance with example techniques discussed herein, linking of the different containers may be leveraged so that the containers may work together as a system. Such linking may include Internet Protocol (IP) address mapping and translation. Consequently, a client system may have a view that it is working with a single IP; however, due to the isolation provided, the IP address and port provided to the client be translated to an internal IP address and port, and thus requests to the same IP address can be routed to distributed components.

In some embodiments, a dormancy feature may be used. When selected, the component may enter into read-only transaction mode. In some embodiments, the level of dormancy may be controlled to provide access to all users, or to selected users, or only to administrator users. Access may be limited to read-only or limited administrative usage for the dormant systems.

Example techniques discussed herein may provide support for "seamless" upgrade (i.e., upgrade/downgrade without downtime). For example, this may include switching over jobs and workflows among the running containers, and garbage collecting pending/stalled jobs of older containers (e.g., older versions).

FIG. 1 is a block diagram illustrating one embodiment of a distributed computing system 30 comprising client systems 31, 32, 33 that communicate through a network 34 with server system 36. Server system 36 includes one or more server devices coupled to storage 38. Server system 36 provides a content management system 50 that manages a repository 70 on storage devices 38 and provides access to the repository 70 for client applications 41, 42, 43 on client systems 31, 32, 33. In one embodiment, the network 34 is an Ethernet connection using TCP/IP communication methods with both client devices and server machines. However, other types of network connection technologies are well known and may also be used to full advantage, including local area network (LAN), wide area network (WAN), storage area network (SAN), the Internet, etc. Client systems may be any type of processor-based digital device, such as desktop or laptop computer, smart hand-held device, or other device.

Client applications 41, 42, 43 enable users to access information, query information and perform other operations on information stored or managed by content management system 50. In one embodiment, a web browser application executing on a client system enables users to select, access, retrieve, query or perform other operations on information stored or managed by content management system 50. In another embodiment, an application executing at an application server acts as a client application that communicates with content management system 50 on behalf of users.

Content server management system 50 manages data resources (files, folders or other discrete sets of data) in repository 70 and services requests form client application 41, 42, 43 to perform operations on content in repository 70. Repository 70 may include, for example, one or more databases 74 or file systems 72. A repository may be a managed unit of content and metadata storage. The managed unit, according to one embodiment, includes content storage that stores native content files and metadata storage in a database system that stores properties of these content files called metadata, such as document owner, version, and creation date. Metadata describes the content object and its relationship between other objects in the repository, and is used to manage and search for content. Multiple repositories may be implemented through the same file database and file system. In some embodiments, a database 74 may also store administrative information, such as users, groups and other information. Each repository may have a name and/or other repository identifier to distinguish the repository as a managed unit from other repositories. Client applications 41, 42, 43 can create, read, write and delete content in repository 70 through content management system 50, subject to permissions and rules.

Content management system 50 may comprise a plurality of functional components (e.g., executable components such as applications) that cooperate to provide a system that receives requests from one or more of client applications 41, 42, 43, performs processing in order to satisfy the requests, and forwards the resultant information back to the requesting client system. The processing required to satisfy a request may be performed by server system 36 or may alternatively be delegated to or obtained with the help of other server machines connected to communication network 34 or to server system 36.

According to one embodiment, server system 36 is configured to provide a plurality of virtual execution environments in which the functional components of content management system 50 execute. In some embodiments, the runtime and component data of a component are implemented in different virtual execution environments executing on the same or different server system machines.

Figure 2:
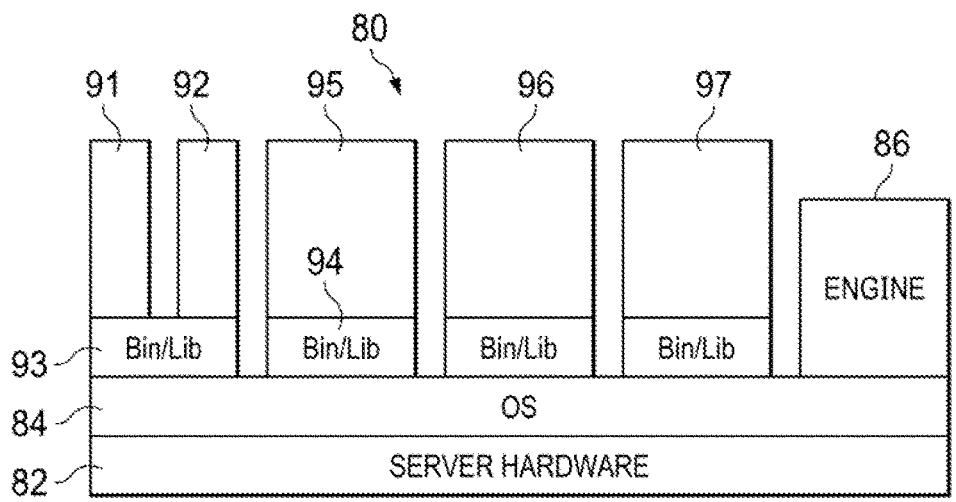
FIG. 2 illustrates one embodiment of a server machine.

FIG. 2 is a diagrammatic representation of a server machine 80 (e.g., a server machine of server system 36) that can provide virtual execution environments in the form of containers. Server machine 80 comprises server hardware 82, an operating system 84 and a container framework to run containers. In this context, a running "container" is a set of processes that provide an isolated execution environment in which an executable component (e.g., an application) can run isolated on a shared operating system. A container may be an instance of a container image that is an executable package of a software component that includes resources needed to run the component, such as code, runtime, system tools, system libraries. A container image may include an ordered collection of root filesystem changes and the corresponding execution parameters for use within a container runtime. According to one embodiment, a container does not bundle a full operating system (OS), but only libraries/binaries and settings for a component executing in the container.

A container execution engine 86 at a container host device (e.g., server machine 80) automates the deployment of applications inside the software containers by providing a layer of abstraction and automation of operating system level virtualization. The container engine 86 may use resource isolation features of the operating system 84, such as Linux kernel cgroups and kernel namespaces, to allow independent containers to run within a single operating system instance. A container is allocated memory and other resources on the container host device. Each container may be configured with links to other containers and components in the other containers so that components in one container may retrieve data from other containers. Multiple containers can share binaries/libraries. For example, containers 91 and 92 may share binaries/libs 93. Further, the containers on a host device all run on the same host OS, without the need to store a guest OS for every container.

Software container platforms, such as but not limited to, DOCKER (DOCKER is an open source container platform by DOCKER, INC. of San Francisco, Calif.), may be used to run and manage functional components of a content management system side-by-side in isolated containers to achieve improved computing density. The DOCKER platform can provide, for example, stateless containers in which data created in the container is not persisted in the container after the container stops. The containers in other embodiments can comprise other types of containers such as, but not limited to other types of Linux containers (LXCs) and WINDOWS containers including MICROSOFT AZURE containers (WINDOWS and AZURE of MICROSOFT CORPORATION, Redmond, Wash., United States).

A container implementation of a content management system as discussed herein can automate many repetitive tasks of setting up and configuring software environments including auto-provisioning, on-demand/auto orchestration, scale-up/down, etc.

According to one embodiment, components of a content management system may run in different containers. For example, binaries 93 may be executable to provide a different type of component than binaries 94 and thus container 91 can provide a different type of component than container 95. As another example, containers may run different versions of the same component.

As discussed in more detail below, the runtime environment and component data for a component may be in different containers. For example, container 95 may provide the runtime for a server component (e.g., container 95 include the binaries for the server component) while container 96 stores the configuration information for the component and container 97 persistently stores logs output by the component of container 95. The containers that provide a runtime for a functional component and the containers that persist component data may run on the same machine or different machines.

Figure 3:
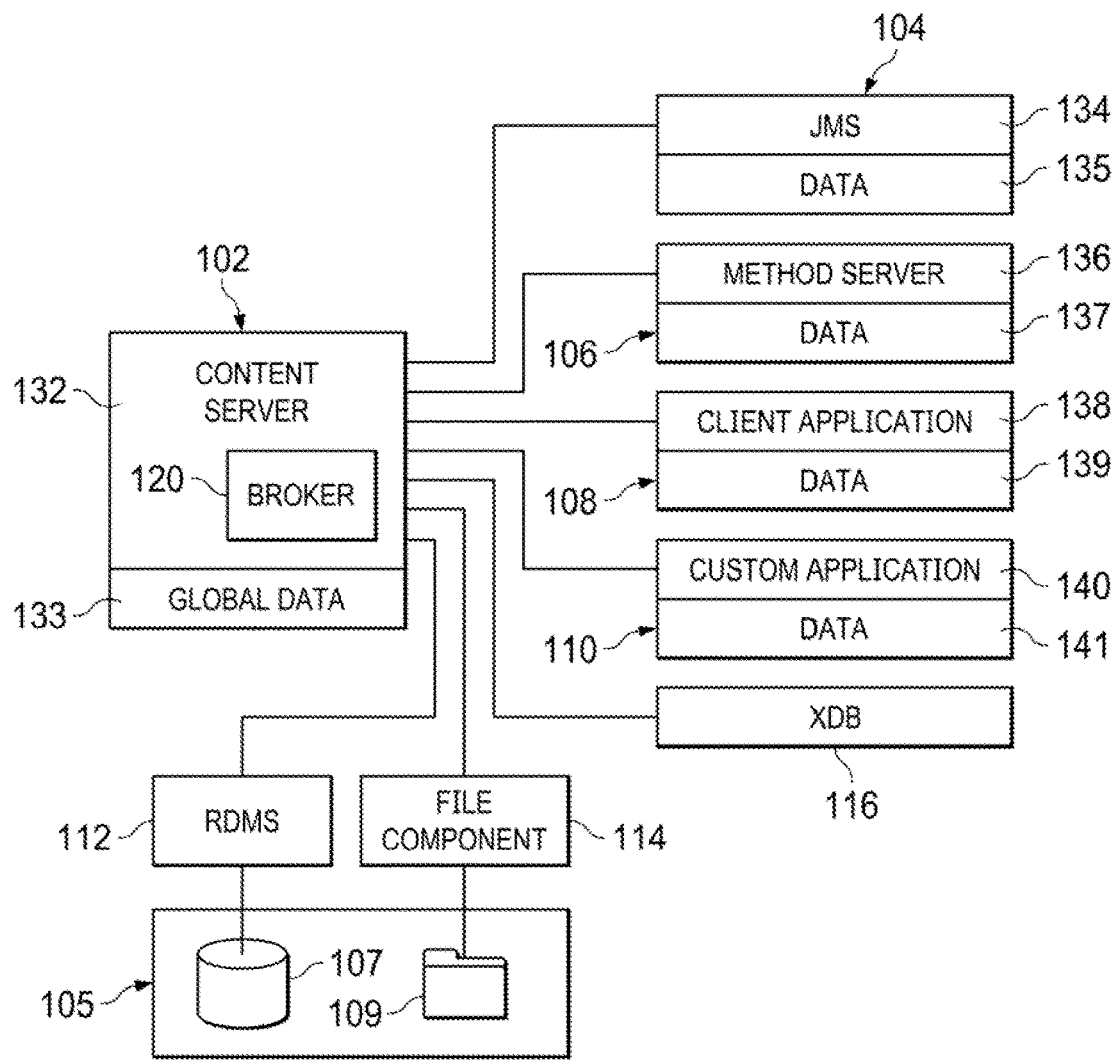
FIG. 3 is a block diagram depicting one embodiment of a container environment.

Container may be used to provide a variety of components of a system, such as a content management system. FIG. 3 is a block diagram depicting one embodiment of a container environment 100 comprising a plurality of containers that are implemented by one or more container host devices, such as one or more server machines 80. Containers may be utilized to implement a variety of different types of functionality in environment 100. Multiple containers may be implemented on a single container host or the containers may be distributed to two or more hosts that communicate via a network. The containers may reside in a cloud environment. In a multi-tenant architecture, one or more of the containers may be associated with particular tenants. In some cases, a component has its component data and runtimes in separate containers implemented on the same or different container host devices. As discussed below, the separation of runtime and component data into separate containers can allow a container component to be upgraded (or otherwise modified) without affecting other components.

Environment 100 includes a content management system with functional components (executable components) distributed across multiple containers. According to one embodiment, environment 100 includes containers providing a content server 102, a Java Method Server (JMS) 104, a second method server 106, a client application 108, a custom application 110, a relational database management system (RDBMS) 112, a file services component 114 and an XDB component 116. Environment 100 further includes a broker 120 which may be provided by content server 102 or may be a separate component. The components may communicate through a network comprising one or more of a local area network (LAN), wide area network (WAN), or the Internet. Other communication implementations are also possible.

The content management system includes content server 102 through which client applications (e.g., client application 108) can access and perform operations on content in repository 105. Content server provides an engine for activities of the content management system. The content server 102 may implement multiple services that can be made available to clients. In some embodiments, services may be made available as hosted servers hosted by content server 102. The content server 102 may manage data resources (files, folders or other discrete sets of data) in one or more repositories. For example, content server 102 may communicate with RDBMS 112 and file services 114 (e.g., NFS or other file system) to manage repositories of content in one or more file stores and/or databases. Additionally, content server 102 may communicate with database management system 116—in one embodiment an xPlore (XDB) system—that stores search related data (e.g., index, keywords or other search related data for searching content (objects) stored in the repositories).

According to one embodiment, content server 102 manages content stored in object-based repositories, such as repository 105. A repository may be a managed unit of content and metadata storage. The managed unit, according to one embodiment, includes content storage 107 that stores native content files and metadata storage 109 in a relational database system that stores properties of these content files called metadata, such as document owner, version, and creation date. Metadata describes the content object and its relationship between other objects in the repository, and is used to manage and search for content. Multiple repositories may be implemented through the same file storage system and RDBMS. Each repository may have a name and/or other repository identifier to distinguish the repository as a managed unit from other repositories. According to one embodiment, repository 105 may be a DOCUMENTUM DOCBASE by OPENTEXT CORPORATION of Waterloo, Ontario, Canada.

According to one embodiment, a repository is managed and made available to users and applications via a repository service provided by a content server 102. For example, repository 105 may be managed and made available to users and applications via a corresponding service provided by content server 102. The repository service can be configured with the repository name and/or other repository id and a data source so that the repository service can connect to the underlying RDBMS and/or file system for repository 105. Content server 102 can provide an Application Program Interface (API) or other interface to allow applications on client devices to access a repository (e.g., to utilize a repository service). For example, a repository service may be made available, in some embodiments, as a hosted server accessible by clients (e.g., a repository service named "winsql" may be made available as a "winsql" server hosted by content server 102 and a repository service "winsql2" may be made available as a "winsql2" server hosted by content server 102). If multiple content servers 102 provide access to the same repository, the content servers may run instances of the same service.

Content server 102 may cooperate with executable components in other containers to service a client request. For example, environment 100 includes JAVA Method Server (JMS) 104 and a second method server 106, such as a When a client invokes a method server call, content server 102 may call the method from JMS 104 or method server 106. As another example, content server 102 may communicate with RDBMS 112 and file storage service 114 to store, access, update, delete content (objects). When content server 102 starts, it may be provided runtime links (links to the runtime location) and/or any other information required for connecting to the other components with which content server 102 interacts. In environment 100, content server 102 may be provided with links to one or more of a JAVA Method Server (JMS 104), method server 106, database system 116, broker 120 or other components running in containers. The runtime links may be provided as part of the configuration of the content server 102, for example, as part of a broker 120 service discussed further below. In other embodiments, the content server 102 may query a remote broker for the locations of services.

According to one embodiment, JMS 104 is an application server for executing content server java methods. The server may itself be a Java-based web application that communicates with the content server 102 via HTTP calls. Each time a method is invoked, the content server 102 makes an HTTP request passing the name of the Java class which implements the method along with any specified arguments to a servlet configured to execute the specified method. JMS may be used for running Java methods that constitute lifecycle and flow management activities. Method server 106 may comprise an application server for executing methods according to other languages, including proprietary languages. Method server 106 may be, for example, a DOCUMENTUM DOCBASICS method server (DOCUMENTUM by OPENTEXT CORPORATION of Waterloo, Ontario, Canada). JMS 104 and method server 106 may comprise interfaces to communicate with content server 102, broker 120 or other broker.

Additionally, a client application 108 and custom application 110 may communicate with content server 102, and each may be implemented in a container. For example, a custom application 110 may be based upon libraries provided by a provider of services, and may be written by a user. Each client application 108 or custom application 110 may comprise interface API software for accessing broker 120 and content server 102.

Broker 120, which may be a service of content server 120 or a component running in a separate container, acts as a service registry for services in system 100, maintains a map of services to servers providing the services and acts as a name server for the content server and/or other servers in environment 100. One example of a service registry that can be maintained by broker 120 is discussed in conjunction with FIG. 11A below and one example of server map that can be maintained by broker 120 is discussed in conjunction with FIG. 11B.

When a connect method is issued by a client application, the request goes to the broker 120 identified in an initialization file in the client device. When an application wants to find an available server for a service, broker 120 looks up the servers that provide the service in its server map and provides the server information to the application. Once the application has the details of the server, the application can connect to the server to perform other operations.

The broker 120 may rely on the servers to regularly broadcast or project service/status/connection information to broker 120. Various runtime components, such as content server 102, JMS 104, method server 106, may be configured to project to broker 120 or other broker to update a service registry with service and status information. This feature, i.e., which connection broker to project to, may be set in the configuration file (e.g., config.ini) for each server. For example, when content server 102 (or other component) is started, the component can connect to one or more brokers 120 to which it is configured to project, provide details of the services available at the content server 102 (e.g., repository services or other services) and provide a status of the content server. Thus, when a new server or service is added, the map in broker 120 may be updated so that users may be routed to the new service or server through broker requests. Similarly, when a service or server is shut down, the map in broker 120 may be updated so that users are not provided with the service or server information.

A component may request the services available to the application from broker 120 and the servers providing the services. This feature, i.e., which connection broker to connect to and services to request, may be set in a configuration file (e.g., config.ini) for a component. According to one embodiment, a component (e.g., content server 120, a client application 108, custom application 110) is configured with a network address for a broker 120 and queries the broker 120 in order to determine the services available to the client. For example, at startup, content server 120 may request a list of method services available to the content server. As another example, a client application 108 may request the particular repository services available to the client and the servers providing each service.

The application may further query broker 120 for the network addresses of the servers (e.g., content server 102) that provide a service the application can access. In one embodiment, the broker 120 informs the application of one or more servers. Upon receiving one or more network addresses from broker 120, the application can contact the server providing the service of interest.

Broker 120 may store one or more sets of rules that specify which users, servers, components can access various components, and in what mode. In some embodiments for example, when a new server or services is projected to broker 120, broker 120 may delay returning the new service or server to clients for some period of time or until particular conditions are met (such as the service or server being fully tested).

According to one embodiment, a portion of the memory of a container host on which broker 120 runs (as part of content server 102 or as a component in a separate container) or other memory accessible by broker 120 may act as a mapping memory that stores data for content broker 120. The mapping data can map servers to services and contain information about the servers, such as the active/inactive status of each functional component. The mapping memory may also map internal IP addresses of containers to corresponding external IP addresses that are accessible to external users of the content management system. The mapping memory may also store control rules, examples of which are discussed below. By way of example, but not limitation, the mapping memory may store one or more indicators of access permissions of specified users for accessing one or more different running components. A user may be provided different levels of access to running components based on the operational mode of the component (e.g., whether the component is active or dormant). In some cases, a user may have different levels of access to different versions of a component when the different versions are concurrently running.

In FIG. 3, several components have component data and runtimes in separate containers implemented on the same or different container host devices. That is, the component binaries (compiled code) are executed in one container and the component data, such as input configuration data and output data (e.g., logs), is stored in one or more other containers. For example, content server 102 runtime is implemented in a runtime container 132 and is linked to a corresponding global data container(s) 133 that stores input data (e.g., configuration data) and output data (e.g., logs) of content server 102; JMS 104 runtime is implemented in a runtime container 134 and is linked to a corresponding data container(s) 135, which stores input data (e.g., configuration data) and output data (e.g., log data) of JMS 104; second method server 106 runtime is implemented in a method server runtime container 136 and is linked to a corresponding data container(s) 137 that stores input data (e.g., configuration data) and output data (e.g., logs) of method server 106; client application 108 runtime is implemented in a runtime container 138 and is linked to a corresponding data container(s) 139 that stores input data (e.g., configuration data) and output data (e.g., logs) of the client application; custom application 110 runtime is implemented in a runtime container 140 and is linked to a corresponding data container(s) 141 that stores input data (e.g., configuration data) and output data (e.g., logs) of the custom application 110. Containers 133, 135, 137, 139, 141 provide processes to allow other containers to retrieve data from or write data to the container. Containers 133, 135, 137, 139 and 141 may include, for example, volumes, bind mounts or other mechanisms to persistently store data.

The content server 102, JMS 104, method server 106, application 108 and application 108 may be said to be stateless components as the component input configuration data and output data is not persisted in the runtime container for that component. According to one embodiment, the runtime containers may be stateless containers of binaries that each include memory having stored thereon processor-executable instructions configured to provide a functional component of the content management system. Data containers can be configuration containers or other data containers. A configuration container can comprise a configuration memory having stored thereon configuration data used in the containers of binaries. A data container may include a data memory configured to store input data (e.g., non-configuration input data) or output data used in the containers of binaries. Multiple runtime containers may be linked to the same configuration container and data container and may execute different versions of the same functional component. The memory of the machines on which the containers are implemented can be allocated to containers to provide the respective memories for the containers.

According to one embodiment, the configuration data stored in container 133 includes information such as the address or information used to connect to a broker 120, location of the database 107, connection parameters for the database server (e.g., RDBMS 112), job configuration information (e.g., how many simultaneous instances of a job can be executed), location of the file system 109 and other configuration data used by server component 102 to connect to repository 105 and broker 120. When the runtime of content server 102 is initialized, container 132 can be provided information to connect to container 133 (e.g., by an administrator or process starting container 132) so that container 132 can provide the configuration data (e.g., .ini files or other configuration data) to content server 102 at startup. Based on the configuration information, content server 102 can then connect to database 107 and read data, such as users, groups, privileges and other information to be used when processing requests from client applications. Content server 102 can also connect to broker 120 or a remote broker to project its status and determine services available to content server 102. During operation, content server 102 writes logs (output data) to container 133. Additional containers can be launched to add new instances of content server 102, including new versions of content server 102, to the content management system. These new containers can be linked to the same container 133 and consequently, the same configuration data can be used to initialize the components running in them and the same container used to store logs produced by the components.

While FIG. 3 only illustrates a single content server 102, JMS 104, method server 106, client application 108, custom application 110, RDBMS 112, a content management system may include multiple instances of each or may not include some components or may include different components. According to one embodiment, the content management system may include other content server components running in containers. For example, environment 100 may include an accelerated content server, branch office caching server, message server and other components as described in U.S. Pat. No. 9,648,138, entitled "Method and System for Virtual Server Dormancy," which is hereby fully incorporated by reference herein for all purposes, with some or all of the components configured to run in containers. Moreover, some components may be implemented in containers while others are not. In addition, some components may have the component runtime and component data stored in the same container.

As discussed below in conjunction with FIGS. 4-10, new versions of components may be more easily deployed and tested using containers and old versions of components shut down without disrupting operation of the content management system. To further facilitate seamless scaling and deprecation of servers, server components (e.g., content servers or other server components) may be configured with a "dormant" mode of operation. The dormant mode can be invoked through program instructions executed in relevant computer-implemented components, for example, using a remote procedure call (RPC) in the server, and application programming interfaces (APIs) in other components. Instructions may also include status checks to see whether the selected components are in the dormant mode or not.

In a dormant mode, a server component generally prohibits new connections to the server and allows server content to be accessed in a read-only mode. However, an exception to the prohibition against new connections may be provided for the privileged user group to allow them to connect and perform regular content server and repository transactions as well as administrative tasks. The privileged users, in some embodiments, may have read/write access to the content through the server.

In accordance with one embodiment, a container running a server component can be configured to start a server in the "dormant" mode. The server may be transitioned to an "active" mode at a predefined time or at the occurrence of an event. An "active" server may be transitioned to a "dormant" mode. Any pending transactions in existing sessions are preferably completed prior to moving to read-only status for non-privileged users (non-privileged meaning with insufficient privileges to make new connections or have read/write access to the content of a dormant mode server, but in some circumstances having other privileges within environment 100). When a server is in the dormant mode, its status at the connection broker will be updated, and the connection broker will notify client applications (or other applications) of the dormant mode.

In the context of the content management system described above, in addition to providing notification of the changed server mode, there are other restrictions that may be enforced by the content server 102 upon entering a dormant mode. For example, a job agent, which may schedule and process jobs for the server 102, may be prohibited from processing jobs for the dormant server 102, and methods may be prohibited from launching through the Java Method Server by the dormant server 102 not sending any HTTP post instructions. As another example, where the content server 102 manages a repository, the elements of the repository can also be made read-only through the content server 102—no changes can be made to content in the file system, to metadata in the database, or to the repository index. However, in other embodiments, a server 102 does not make the elements of the repository read only when transitioning to a dormant mode. This may be helpful when multiple content servers 102 provide access to the same repository. In this case, a dormant content server may only accept read transactions (from non-privileged users) whereas an active content server providing access to the same repository can accept read/write transactions.

The dormant server mode may be useful to help avoid overloading issues. For example, an active server that appears to be failing or becoming overloaded may be moved to a dormant mode so that it can avoid processing new tasks and simply complete processing of its existing load if possible. The server may then be taken offline for evaluation, upgrade, repair or replacement as necessary.

The dormant mode may be used to provide system flexibility, for example, by being part of a scheme to balance loads across a system of multiple servers, or to allocate the deployment of resources dynamically in a multiple server system.

The dormant mode may also be useful to make component and/or system upgrades, such as a software patch, service pack, minor release, or major release. For example, in one embodiment, the dormant mode facilitates performing upgrades in a multiple server system by moving one server at a time to the dormant mode, upgrading the server, then returning the server to active service.

In some embodiments, the dormant mode can only be set or reset by members of a privileged access group. For example, a group can be established and maintained by a superuser and/or group administrator to use and administer a server or server cluster resource. As noted above, in some embodiments, a server, such as content server 102, can be configured to start in a dormant mode. The server can be switched to an active mode in response to a command from a member of a privileged access group or the runtime container or in response to other defined events. The superuser can also establish a second group to allow restricted users to access the content server in read-only mode when it is in dormant mode. The superuser can also provide access to all users in read-only mode when the content server is in dormant mode.

According to one embodiment, upon receiving a request for dormancy, (i) content server 102 can initiate a status change to dormant; (ii) a request to make a status change to dormant may be sent to related content servers, such as an Accelerated Content Server (ACS); and (iii) posts to the JMS 104 are stopped. After changing its status to dormant, the content server 102 projects its changed status to the broker 120. The related content server may also project its status change to the connection broker upon entering the dormant mode.

Upon receiving a dormancy request, the content server 102 may wait for current sessions to either commit or abort. For example, the content server 102 waits for open data connections to close; stops all post requests to JMS 104; waits for all open transactions to close; and makes any current sessions for non-privileged users read-only. One example of receiving and processing a request to change to dormant status is described in U.S. Pat. No. 9,648,138, entitled "Method and System for Virtual Server Dormancy," which is fully incorporated by reference herein for all purposes.

Use of the dormant mode may provide an effective mechanism for load balancing in a server cluster. The server loads are distributed generally by the broker. By setting one or more servers into a dormant mode, the broker can redistribute loads to other active servers. This can force reduced loading before it becomes problematic.

For example, a load threshold is set. Each of the server loads in the cluster is monitored, for example, by a user in the Data Center Manager group, or with a monitoring software routine in the server itself, and the server loads are periodically compared to the threshold. If no server loads exceed the threshold, then monitoring continues. If a server load does exceed the threshold, then that server is handled by a load balancing module, and the process returns to the monitoring step.

The overloaded server can be placed into the dormant mode. At this point, no new connections are accepted from client/users, and the server status is projected to the connection broker, i.e., changed mode to dormant. Pending transactions on existing connections are continued until complete or the server load has fallen to within acceptable limits. When all pending transactions are completed at the server, the server is returned to the active mode. One example of load balancing is described in U.S. Pat. No. 9,648,138, entitled "Method and System for Virtual Server Dormancy," which is fully incorporated by reference herein for all purposes.

A server deployment may be scaled up or down. According to one embodiment, the broker 120 maintains information about ongoing load requirements and available server capacity and distributes loads equally across all servers providing access to the same repository or providing the same service. The broker periodically evaluates the load requirements, considers whether more capacity is needed, based upon collected metrics. If so, then one or more servers is added by instantiating a new container to run a version of the server. The broker is updated, then returns to maintain and distribute loads. If more capacity was not called, then the question of whether less capacity is needed, based upon collected metrics, is considered. If not, then the process returns to maintain and distribute loads. If so, then one or more servers is moved to a dormant mode, then the connection broker is updated, and returns to maintain and distribute loads.

There are numerous ways to monitor performance and obtain performance metrics from the server system. For example, machine resources, such as shared memory, CPU usage, file handles, are readily available from the operating system. Resources of the content server may also be monitored and evaluated, such as internal cache usage; response time for each RPC or each user transaction; size of database tables; configuration settings for workflow agents; database usage; and file system usage. Activity response times may be recorded and stored in shared memory; or this information may be obtained through a query. Global cache and session cache are monitored for cache consumption.

The content server 102 and other components can provide an interface to return performance metrics data so that it may be aggregated and analyzed. A service may be called or run to collect relevant information.

Figure 4:
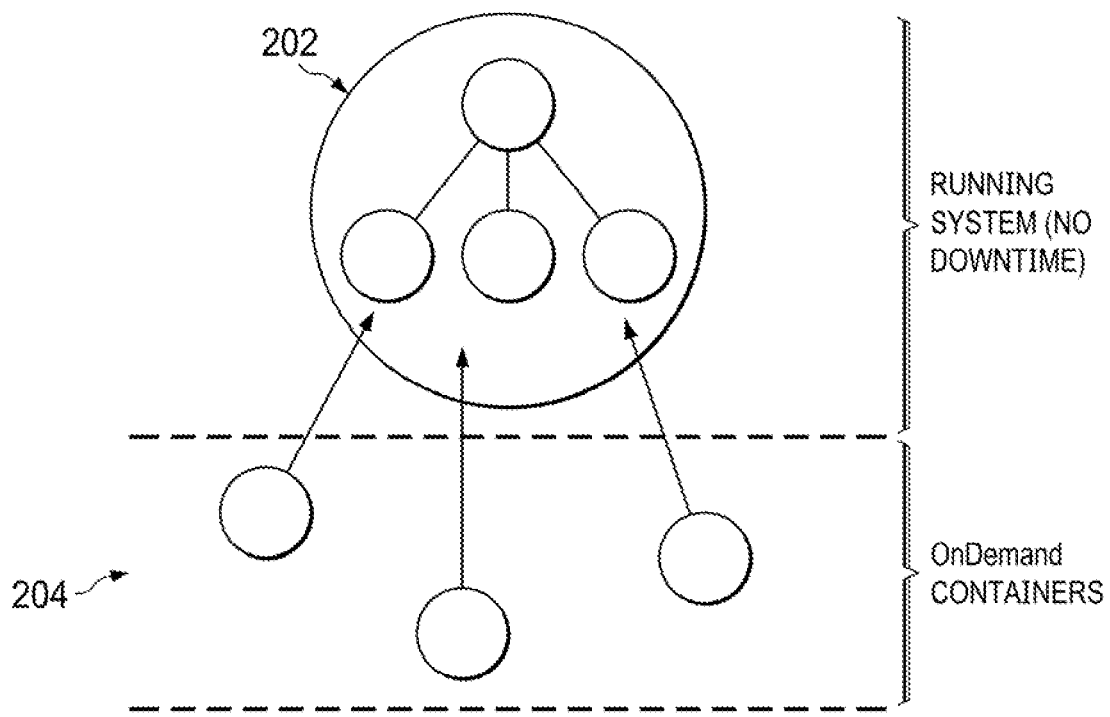
FIG. 4 illustrates a running system with on-demand containers, according to some embodiments.

FIG. 4 illustrates a running system 202 (e.g., a running content management system) comprising a plurality of containers, with on-demand containers 204 that may be started up and shut down dynamically and seamlessly, as needed, to add or remove components from the running system 202. For example, containers may be launched to add additional content servers or content components to a content management system of environment 100. Multiple on-demand containers 204 may be linked to existing common configuration containers and common output data containers as other containers. For example, multiple containers providing content servers may be linked to common configuration containers and output data containers.

Multiple versions of a component may be active concurrently in running system 502 with various users accessing different versions of a component, potentially linked to common configuration containers and common output data containers. One or more brokers may manage the flow of traffic to the various different components, on demand.

Modification to running system 202 can be accomplished seamlessly and easily because the service and server maps maintained by a broker (e.g., broker 120) can be easily modified. When a new component starts up in an on-demand container 204, it may project itself to a broker, indicating its new service, its particular IP address, and its current running status. When a component in a container is shutting down, it may indicate to the broker that it is no longer running or that it is shutting down, with an indication of its IP address so that the broker may be updated to no longer route traffic to that component. In some embodiments, if a transaction is in progress, the component will not shut down. For example, the component may analyze all running jobs and only shut down when its jobs are complete to ensure that the operation may continue, to provide a clean shut down.

Figure 5:
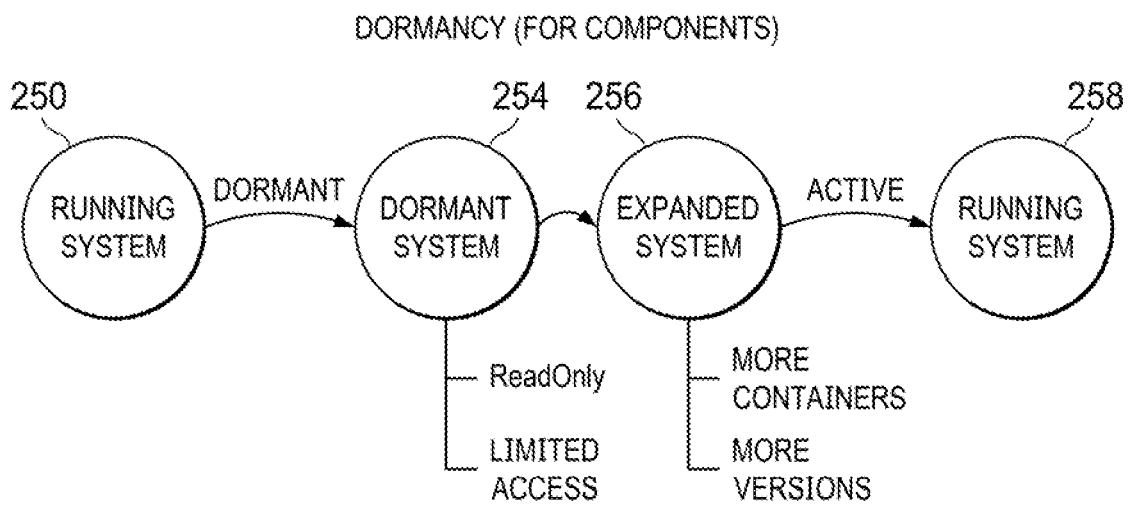
FIG. 5 illustrates an example of dormancy, according to some embodiments.

FIG. 5 illustrates an example of dormancy according to some embodiments. One or more components of a running system 250 (e.g., a content management system of environment 100) may be transitioned to a dormant mode (represented as dormant system 254). In some embodiments, if a component is in a dormant mode, it may be accessible as read-only access, or limited access, or no access, etc. The limits may also be applied differently to different requesting users. In some implementations, these limits may be specified at the broker.

The system may be expanded to an expanded system 256, for example, by executing additional containers to add more components and/or more versions (e.g., by adding additional on-demand containers). In some embodiments, when a new component is added (e.g., a new version), it may be given a dormant access status until it is fully tested. In some cases, other components may remain active when the system is expanded. Once the new components added are viable, their access status may be modified to an active status, transitioning the system to a fully running system 258.

Modification may be easily made to the broker data (e.g., service and server maps), so that the system modifications may be accomplished automatically and seamlessly. Furthermore, multiple versions of a component may be active concurrently with various users accessing different versions of a component that may be linked to common configuration containers and common output data containers. One or more brokers may manage the flow of traffic to the various different components, on demand.

Figure 6:
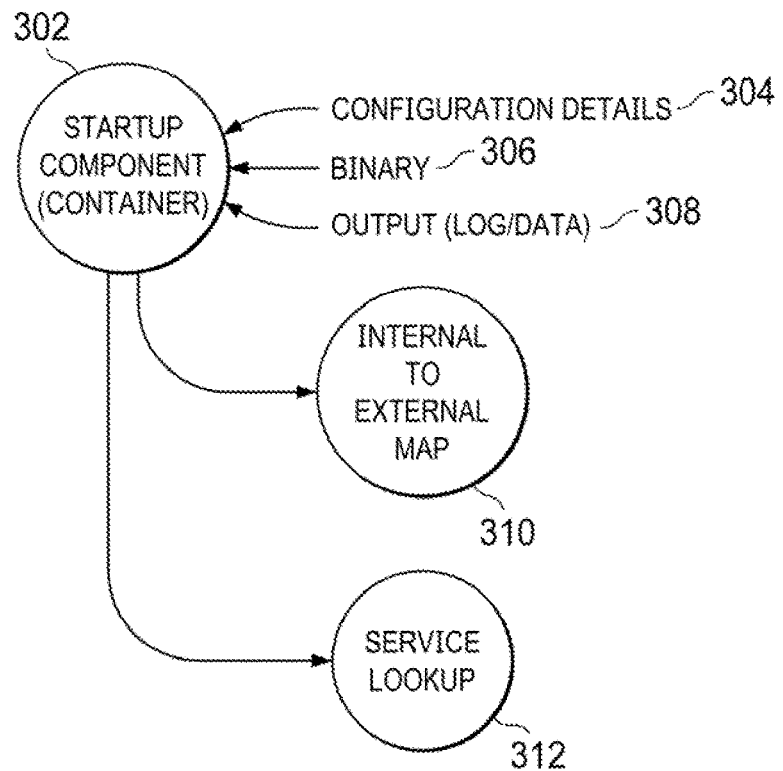
FIG. 6 illustrates a flow of startup of a new container, according to some embodiments.

FIG. 6 illustrates a flow of one embodiment of the startup of a container 302 to add a functional component to a system. For example, a container can be started to add a running component (e.g., content server 102, JMS server 104, method server 106 or other component to a system). The container 302 is bound to various data/data locations to prepare the container 302 to execute the binaries 306 for the component. As part of a runtime container startup, the container 302 is attached to configuration data 304, binaries 306 for a component and output (log/data) 308.

Container 302, according to one embodiment, is an instance of a container image containing binaries 306 while configuration data 304 and output data 308 are volumes in other containers. Dynamic binding may be used if supported by the container framework to bind container 302 to data locations. When a new container 302 is coming up, it may be linked with volumes for configuration 304 and output 308 (e.g., logs and data the new container is producing) using volume attachment, link flags and/or container framework networking. For example, the execution engine of DOCKER can be provided with "-link to [configuration container name]/link to [log file container name]" at startup of the runtime container. An administrator or an automated deployment tool provides the execution engine with the parameters to link the container 302 to the volumes for configuration 304 and output 308 at startup of container 302.

Container engines (e.g., engine 86) provide various addressing formats—both internal and external—for containers. When the new container (e.g., container 302) starts, the container execution engine provides an IP address by which the container can be accessed. This IP address may be internal to the network on which the container host machine is located (e.g., an IP address on the subnet to which the container host device is connected). Each container running on a container host may be provided a different IP address. The container execution engine may also be configured to assign an external IP address. One skilled in the art will understand that the IP address may also be assigned to containers by other sources.

Continuing with the container startup process, the container 302 is configured to retrieve the configuration data 304 from the specified container and write the configuration data 304 to configuration files in the container 302 to be used by the executable component. The container 302 may be configured to mount the configuration data 304 as a file in container 302 that the component is configured to access. It can be noted, however, that making the configuration data 304 available in container 302 can be in-memory operations so that the configuration data 304 is not persisted by container 302.

Container 302 launches the component (e.g., executes the binaries 306). According to one embodiment, container 302 is configured to launch the component in a dormant mode. The component is configured to request access to the configuration data 304 (for example a config.ini file) from the execution environment (the container 302) and use the configuration data 304 during initialization. The configuration 304 for the new component may include information indicating a location of a broker, and other parameters for startup (initiation) of the new component. For example, the parameters may include an IP address, a number (cardinality) of instances of a job that can run at one time (concurrently), the locations of databases and file systems to be used by the component, connection parameters for the databases and files systems, the location of a broker and other parameters. Further, the container can pass the location for output 308 and container IP address(es) or other addressing information and/or container identity information to the component. The component may initialize a log file, and perform other initializing activities.

Once the component starts up in the container 302, the component may register itself with a broker to which it is configured to project by configuration 304, providing the broker with the IP address(es) or other addressing information for populating an internal-to-external IP address mapping (310) and information indicating whether the new container is ready to accept connections from users. Examples of server information and service information that may be provided to a broker (e.g., broker 120) are discussed below. The broker may use the internal and external IP addresses provided by container 302 or in other embodiments IP addresses provided by the broker when providing the location of components to requesting applications. As one example, the broker may map an internal IP address provided by container 302 to an external IP address configured at the broker. The network in which container 302 operates can be configured so that external requests to the external IP address for container 302 are routed to container 302. One embodiment of mapping internal to external IP address map is illustrated in FIG. 12.

As shown in FIG. 6, the component may also provide a list of services (such as repository services) that it hosts to the broker for service lookup (312). The component may also communicate whether the component is dormant or active. In some embodiments, the component is configured to communicate its current status and hosted services to the broker at predetermined intervals during execution.

Additionally, the component executing in container 302 may be configured to perform a service lookup at startup. For example, the new component may be informed by its configuration 304 that it needs to connect to other services in order to configure its full functionality, and the service lookup 312 may provide the locations of the other services. Using the example of FIG. 3, for example, a newly started content server 102 may perform a service via broker 120 to lookup a JMS server 104 or method server 106 that it will use in responding to client requests.

Figure 7:
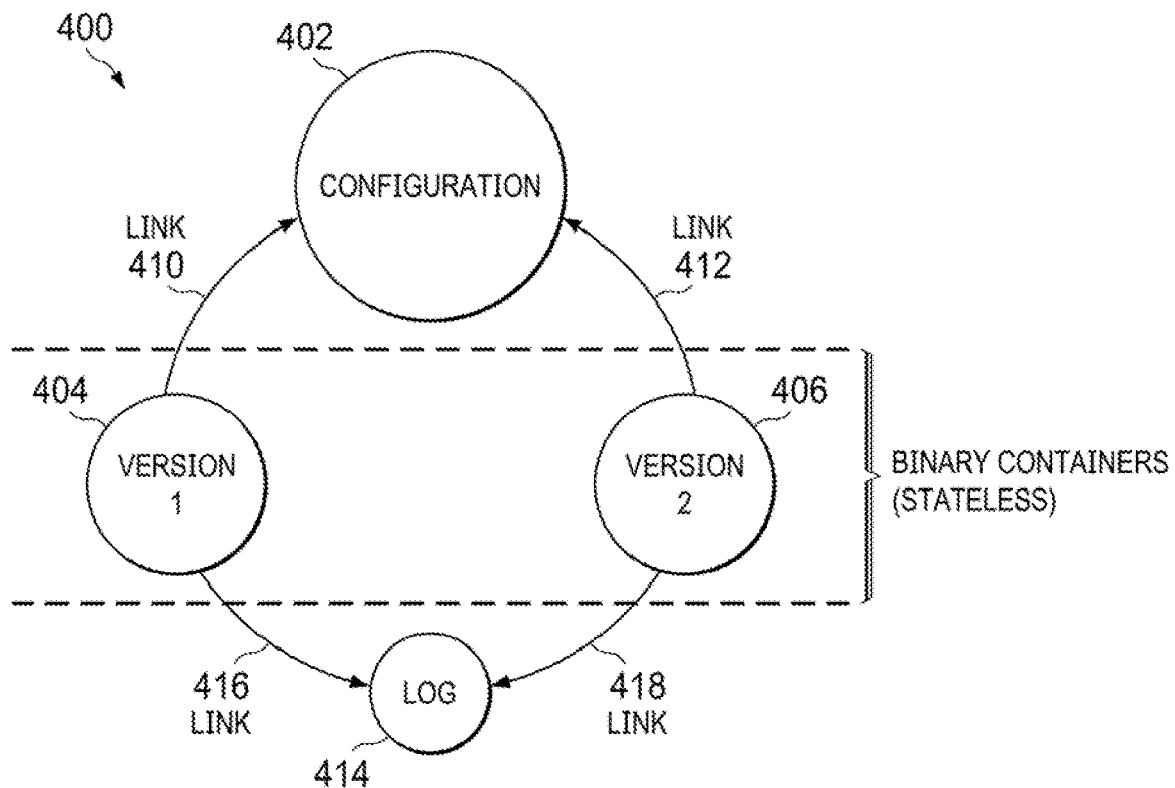
FIG. 7 illustrates different versions of a running component, according to some embodiments.

Embodiments described herein can facilitate updating a system to concurrently provide multiple versions of a component. FIG. 7 illustrates one embodiment of a system of containers 400 that includes containers 404, 406. According to one embodiment, containers 404, 406 are stateless containers of binaries, each comprising a code memory having stored thereon processor-executable instructions configured to provide different versions of a functional component of the content management system. The multiple versions can thus be implemented as stateless components in stateless binary containers 404, 406. An administrator (or process starting a container) may provide various options for dynamic execution of the new container, including linking the container to a configuration container and linking the container to an output container 414 using, e.g., link flags or other mechanism. Consequently, both containers 404, 406 may be linked to a common configuration container 402 and a common log container 414. Configuration container 402 and log container 414, in some embodiments, are running containers in which configuration data and log data, respectively, is persistently stored in the filesystem of the respective container and that provide processes to allow other containers to retrieve data from or write data to the data volume container.

Containers may be configured to run multiple instances of the same component (e.g., instances of the same version of a content server) or multiple versions of a component (e.g., multiple versions of a content server having non-identical binaries). As discussed above, when a new container providing a component runtime is started, the container execution engine may execute a start process and bind the container to container 402 and container 414. In the example of FIG. 7, containers 404, 406 are linked to the same configuration container 402 via links 410 and 412, respectively, and to log container 414 by links 416, 418, respectively (e.g., as specified at the startup of each of containers 404, 406).

In the embodiment illustrated, each container of binaries 404, 406 is configured to execute the respective instructions (binaries) to provide a different version of a functional component. For example, container 404 executes Version1 of a content server and Version2 of the content server. Container 406 and container 408 may be initialized using identical configuration data and may initialize log files in the same output data container 414. Thus, containers 404 and 406 user component configuration data in common and use the same container to store output data.

While only two versions of a component are shown in FIG. 7, there may be hundreds of versions, or hundreds of thousands of different versions, running as binary containers, all sharing the configuration container 402 and the log container 414 in common. Thus, different versions may come and go, as needed, in a seamless manner. Furthermore, the binary containers running different versions of a component may be stateless, as they do not persistently store initialization configuration data of the content management system component or output data of the content management system component.

Figure 8:
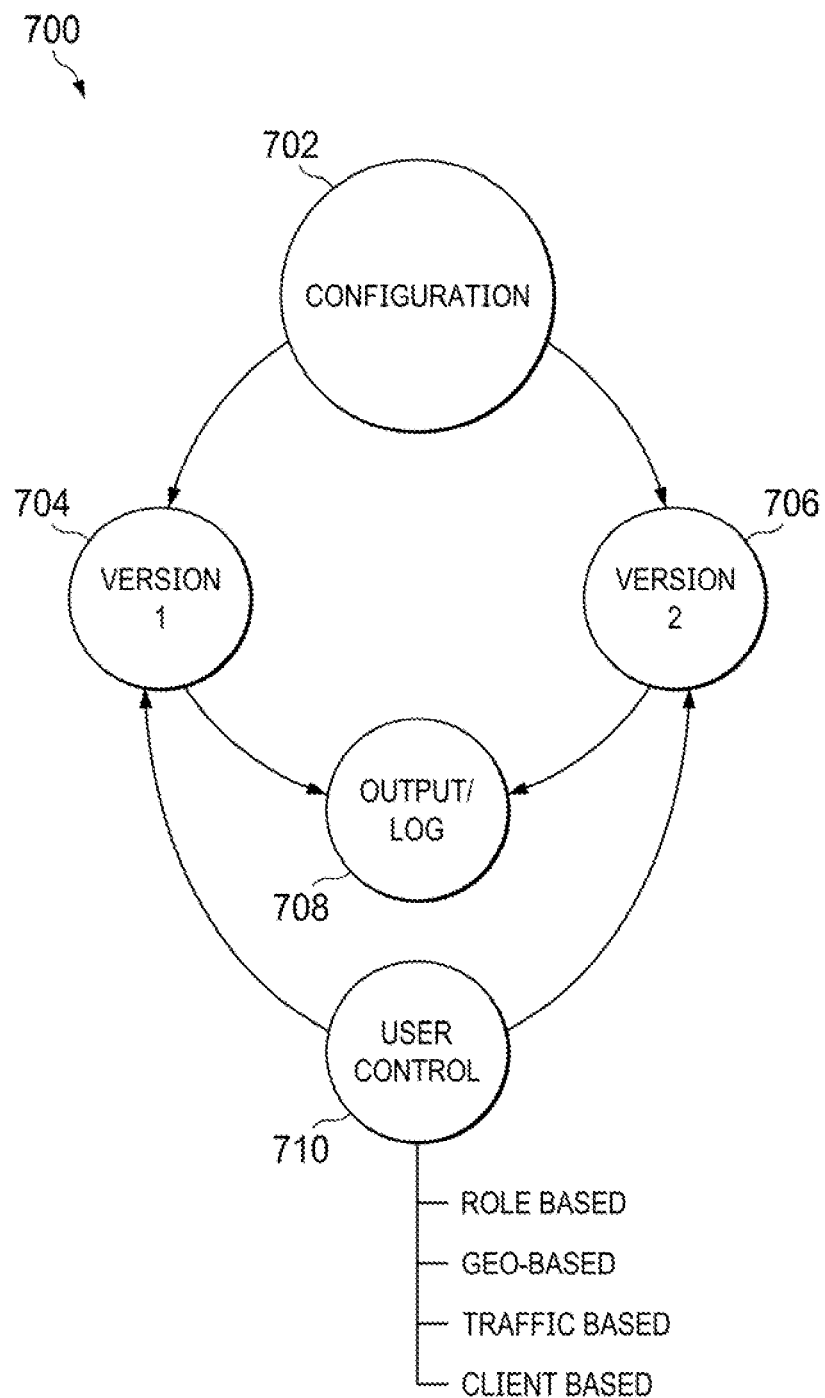
FIG. 8 illustrates various user controls of components, according to some embodiments.

FIG. 8 illustrates one embodiment of a running system 700 comprising various accessibility control rules 710 for components, according to some embodiments. As discussed above, control rules may be stored in a mapping memory. As shown in FIG. 8, containers 704, 706 running different versions of a component (e.g., different content servers) may be linked to a common configuration container 702 and common output/log container 708. By way of example, but not limitation, accessibility may be controlled based on a role of a requesting user, a geographic location of the requesting user (or of the component), an amount of traffic, the client being used or other factors. For example, with traffic considerations, various percentages of traffic may be allocated to the different versions based on traffic rules (e.g., load balancing or other rules). As another example, role based rules may specify that a user having a "testing" role be provided "active" status access to a beta version (e.g., version 2), while non-testing users be provided "dormant" status access to the beta version until the beta version is fully tested. Various control rules 710 may be implemented at a broker and/or component. For example, broker 120 may implement traffic-based, client-based, geo-based and some role-based rules, while content server 102 may implement some client-based and role-based rules. The services and server maps returned by the broker to a requesting application can thus be based on control rules 710.

Figure 9A:
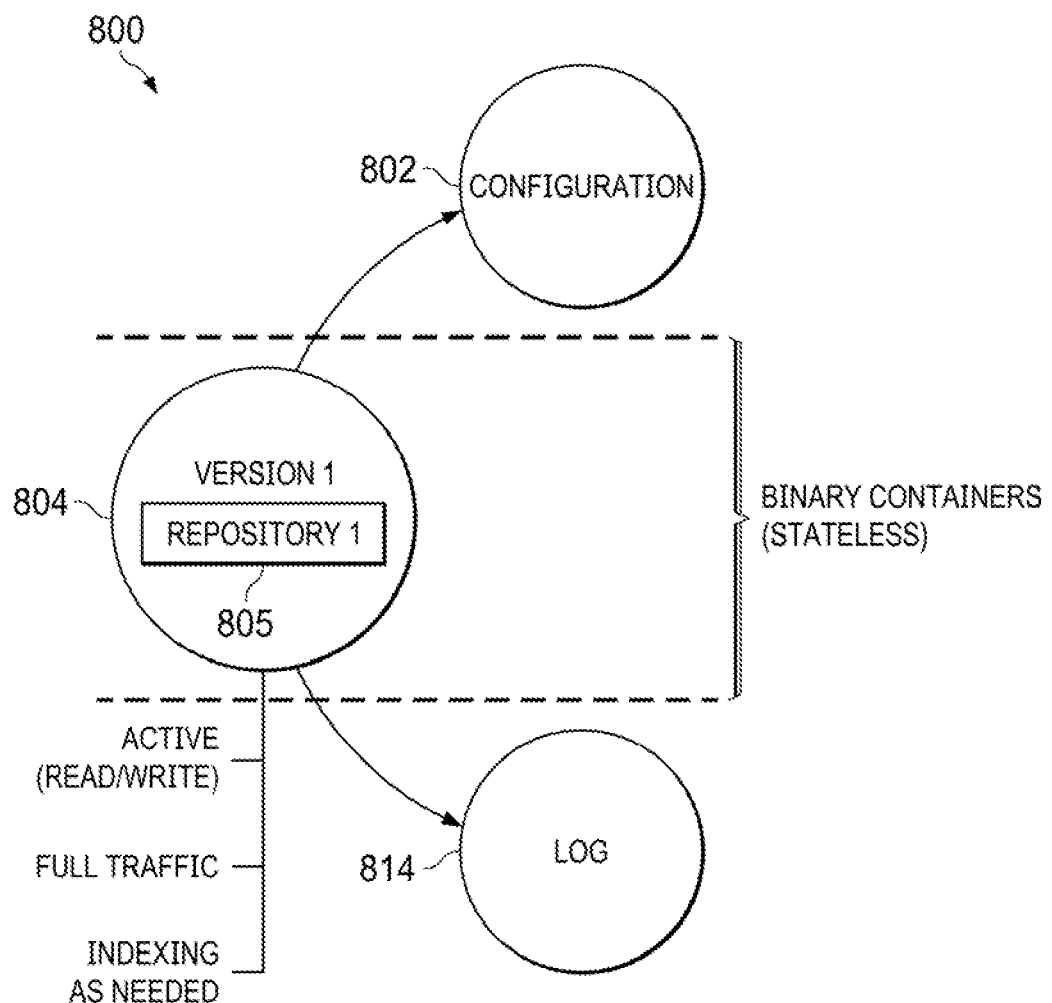
FIG. 9A, FIG. 9B, FIG. 9C and FIG. 9D illustrate one embodiment of a system as containers are added and removed.
Figure 9B:
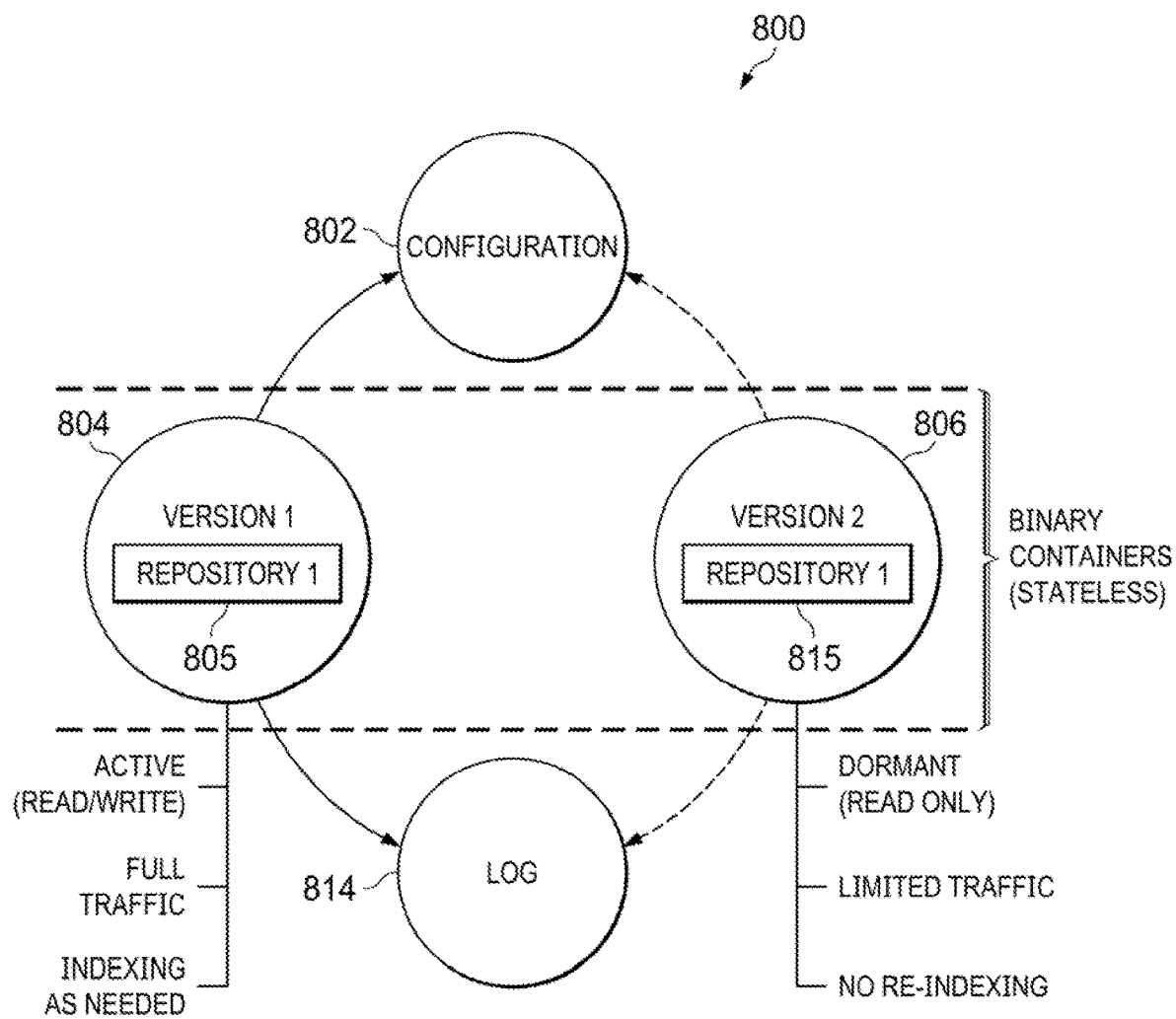

FIG. 9A and FIG. 9B illustrate one embodiment of a system 800 in various configurations. In FIG. 9A, system 800 includes container 804 linked to a configuration container 802 and log container 814 (e.g., as specified at the startup of container 804). A content server (e.g., content server 102) providing a service 805 ("Repository 1" service) is running in container 804. In FIG. 9A, the content server of container 904 is active. Clients may have full access to the repository 1 service 805 (e.g., though a user's access to particular data may be further controlled by the content server based on permissions or other access controls applied to the objects in a repository).

In FIG. 9B, a new container 806 that runs a second version of the content server starts. As illustrated, container 806 is linked to configuration container 802 and log container 814. Thus, while container 806 may contain binaries for Version2 of the content server, Version2 of the content server may be initialized in container 806 using the same configuration that was used to initialize Version1 of the content server running in container 804. Similarly both containers 804, 806 may be linked to a common log container 814, respectively. When Version2 of the content server starts, it may be in a dormant mode and project its dormant mode to a broker. As such only limited access is provided (e.g., based on controls provided by the content server or broker). Version2 of the content server may provide a repository 1 service 815 such that Version1 and Version2 of the content server share repository 1.

Figure 9C:
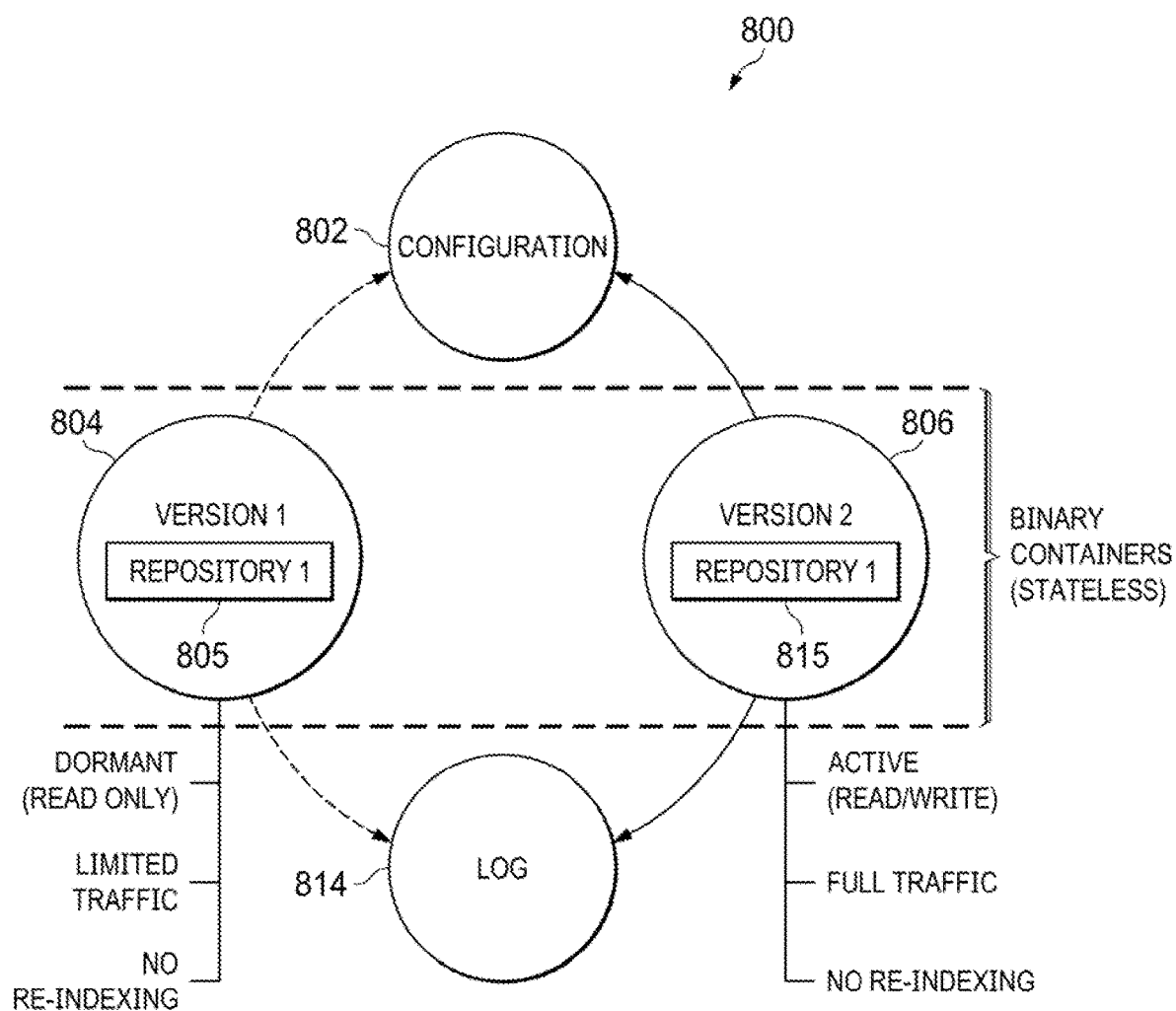
Figure 9D:
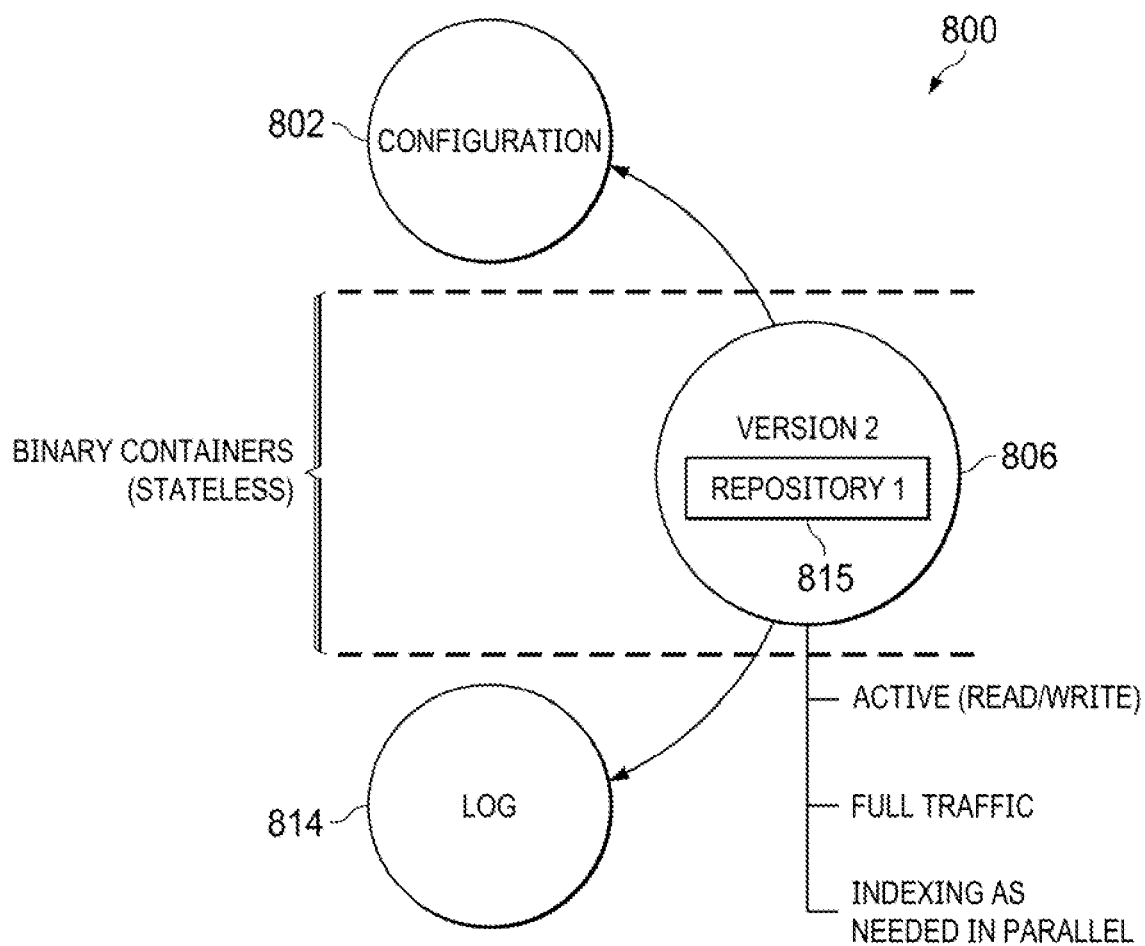

FIGS. 9C and 9D further illustrate examples of system 800 as Version1 of the content server is shut down and container 804 stopped. In FIG. 9C, an administrator may transition content server Version2 in container 806 to an active mode and content server Version1 to a dormant mode. The content servers can project their statuses to a broker. In FIG. 9D, container 804 is stopped. However, clients may maintain access to repository1 because the broker can route clients to content server Version2.

A new version of a component may include a new feature which may require a new column in one or more databases. For example, service 815 provided by Version2 of the content server may be used to manage the same objects as service 805 provided by Version1 of the content server, but may allow for additional attributes to be specified in the content management metadata for the objects (e.g., may add an email address attribute to the content objects to specify an email address of the user who created the object). The addition of attributes may require adding columns to the content management metadata tables.

The addition of attributes or other update events can trigger re-indexing. The may require shutting down a database management system for long periods for such re-indexing activities. However, with techniques discussed herein, re-indexing can be delayed and/or performed in a separate space in parallel (i.e., separate to the space of the current index), so that the new index may be fully developed, and then swapped with the older index when the new index is ready for use.

According to one embodiment, previous versions of components of a content management system can be configured to ignore new attributes in the content management metadata. For example, in FIGS. 9B and 9C, Version1 of the content server can be configured to ignore any content management metadata fields it does not support (e.g., an email attribute added by Version2 of the content server) and to continue using an existing index. When Version2 of the content management system starts, automatic re-indexing is disabled. At some point, an administrator or other user can turn re-indexing back on. Version2, however, does not re-index the existing index. Instead, Version2 is configured to query the database system (e.g., RDBMS 112 of FIG. 3) to perform parallel re-indexing using a separate address space from the existing index. While the parallel re-indexing is being performed, components may simply continue using the older index, with older versions of executing components ignoring newer functionality and attributes when encountered during execution. When the new index is ready, the old index is discarded and replaced with the new index.

Deploying and testing updates (e.g., monthly patches) in content management systems has been a tedious offline process requiring downtime and many users have found it difficult to keep updated to the most recent patches. For example, users have been required to manually download the patch, install it on another system, test it and move it into production manually. Embodiments described herein may include techniques for continuous deployment that allow for testing of patches while components of the content management system remain operational and seamless upgrade of the content management system to incorporate the patch once the patch has been tested.

Figure 10A:
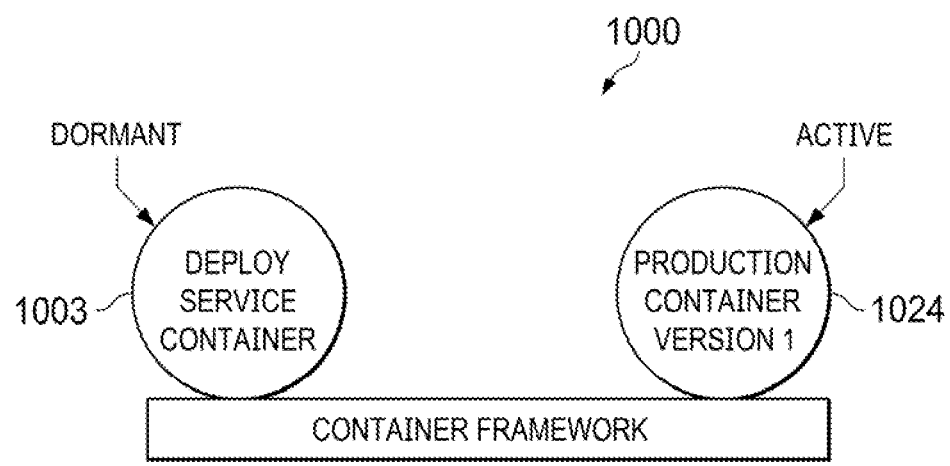
FIG. 10A, FIG. 10B, FIG. 10C, FIG. 10D, FIG. 10E illustrate one embodiment of continual updates.

With reference to FIG. 10A-FIG. 10E, one embodiment of a deployment system 1000 is illustrated. System 1000 includes a production container 1024 in an active mode. In the illustrated embodiment, container 1024 is running a content server Version1. In accordance with example techniques discussed herein, a deployment service is executed in a container 1003 provided at the container host device (e.g., for example as a DOCKER service). In FIG. 10A, container instance 1003 is configured to be in dormant mode both in terms of the container 1003 and the component (e.g. deployment service) inside it.

Figure 10B:
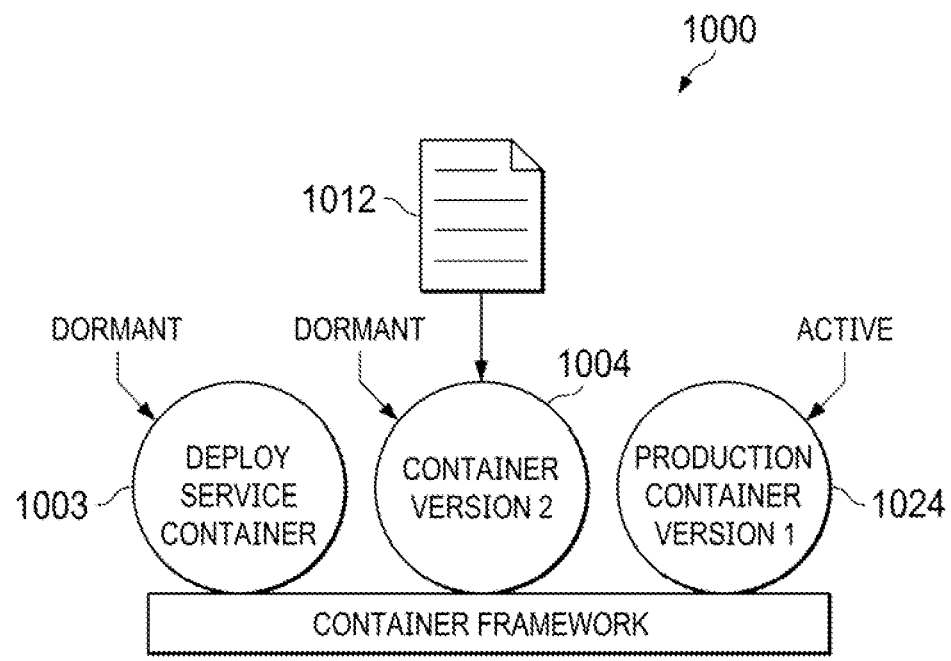

The container instance 1003 is configured to "wake up" on predefined periods (e.g., monthly). Turning to FIG. 10B, the container instance 1003 is configured to pull the latest patch automatically from a provider's web site, and install and configure the patch for execution in a container 1004. For example, the deployment service downloads a container image 1012 for Version2 of a content server from a host web site and installs and configures Version2 in container 1004. The deployment service may link container 1004 to the same configuration and log file containers as container 1024. When Version2 is installed, the container service may issue an "active" mode to the new version of the content server and a "dormant" mode to the Version1 running in the production container. The content server Version2 can project its mode to a broker. Version2 running in container 1004 can then start taking up application load which may be used for testing the new patch. In other embodiments, Version2 running in container 1004 may remain in a dormant mode, but be accessible by certain users based on control rules (e.g., specified at a broker).

Figure 10C:
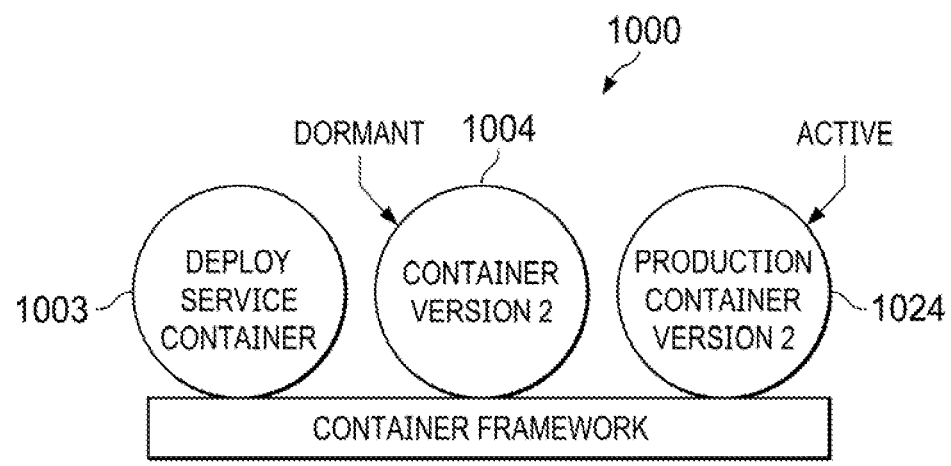

As illustrated in FIG. 10C, when it is determined that Version2 running in container 1004 is stable, the production system may be patched. According to one embodiment, the image 1012 may be published to the container framework and container 1024 restarted using image 1012, thus upgrading the content server of container 1024.

Figure 10D:
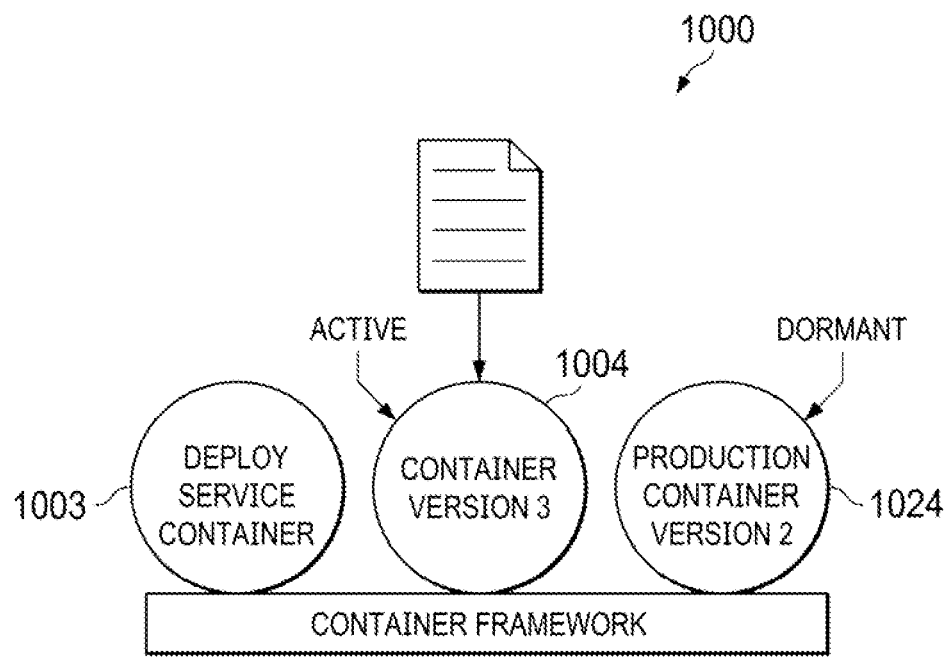
Figure 10E:
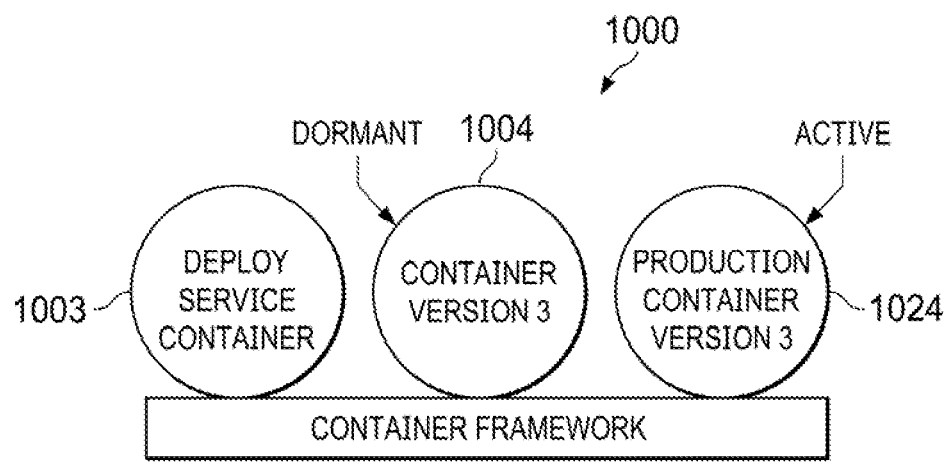

Container 1003 may monitor the production system (e.g., container 1024) and once the new patch is updated, put the production system into an active mode, stop container 1004 (or put container 1004 into a dormant mode) and go back into dormant mode. As discussed above, the content servers can project their active/dormant status to a broker as the modes change. This process can be repeated periodically to perform automated continual deployment as illustrated in FIG. 10D and FIG. 10E.

In another embodiment, when it is determined that Version2 running in container 1104 is stable or meets other criteria, the deployment service stops container 1024 and container 1004 becomes the production container.

FIGS. 11A and 11B illustrate example representations of broker maps, according to some embodiments. A broker (e.g., broker 120 of FIG. 3) may maintain server and service mapping data. For example, the broker as discussed herein may provide service registry information regarding IP addresses of servers providing services. As shown in FIG. 11A at 1102, the broker is configured to respond to requests from clients to get a service map (e.g., getdocbasemap) of available services (e.g., repository services).

As shown in FIG. 11A, a broker host 1104 may be indicated as a content server. A broker port 1106 may be indicated as having a value of 1490. Additionally, a broker network address 1108 and a broker version number 1110 may be indicated. Client applications and functional components of the content management system may be configured with the network address and port of the broker to query the broker to retrieve information about available running services. Based on the map, the broker can return the running services available to the requesting components (e.g., to a client application).

In the example of FIG. 11A, the broker maintains information for three services: "winsql", "winsql2" and "winsql3". A first entry 1112, which corresponds to "winsql", indicates a repository service name "winsql" as a hosted server name, a repository id number, a repository description, a server version number, a repository role, and a dormancy status. Similar types of information are indicated for a second entry 1114 named "winsql2" and a third entry 1116 named "winsql3".

If an application (e.g., a client application) requests a service list, a list of services available to the application may be provided. The application may then request a list of servers currently available for one or more of the services, and may be provided with access information by the broker so that the application may connect to various services. In some embodiments, the broker may handle these requests by looking up the information available in its storage. The broker may provide controls to control access to the various services based on a role of a requesting user, a geographic location of the requesting user (or of the component), an amount of traffic, the client being used or other factors.

According to one embodiment, the list of services returned may be based on user credentials, user information, geographical location of the requesting application host (e.g., location of the client), or other information of a user or application associated with the request or the service being requested. For example, an administrator may configure the broker to control which users get access to services provided by particular components (e.g., particular versions of the content server), as well as what type of access may be provided. As one example, role based rules may specify that a user having a "testing" role be provided "active" status access to a service running on a beta version of a content server while non-testing users be provided "dormant" status access to the service running on the beta version until the beta version is fully tested. The broker may be configured to alter the status of the service returned for different users based on the rules. In some embodiments, the client (or other application) is responsible for enforcing the controls associated with a particular status.

The broker may maintain information for servers hosting services in the service list. Turning to FIG. 11B, the broker can maintain information for servers hosting the "winsql2" service (indicated by server map 1018). In server map 1018, the server name identifies the hosted server provided by the host content server (e.g., content server 102 of FIG. 3) to access the winsql2 repository service. The server host is indicated as a content server. A server status is indicated as "Open" indicating that the server can receive connections. A server version is also indicated, as is a server process ID. A server dormancy status is indicated as "active" (meaning the content server hosting the "winsql2" service has active status in this case). A connect protocol is indicated as "TCP_RPC" and a connection address is indicated with a mapping of an internal IP address, and port, to an external IP address. In another instance of the winsql2 service was running, that version could be on a server having different connection information. The information in connection map 1018 may be provided to the connection broker by the server host (e.g., by the content server 102 or other server hosting the service).

Responsive to a request for a server map for "winsql2", a repository service running on one or more content servers, the broker may analyze the server information 1018 for the service and return a server map containing information for servers providing the service, based on control rules (e.g. rules 710). The broker may provide controls to control access to the various servers based on a role of a requesting user, a geographic location of the requesting user (or of the component), an amount of traffic, the client being used or other factors. Thus, the list of servers returned may be based on user credentials, user information, geographical location of the requesting application host (e.g., location of the client), or other information of a user or application associated with the request or the service being requested.

For example, the broker may be configured to show a requesting first client only a subset of servers running a service and another client a different subset of the servers to support load balancing. As another example, the broker can enforce rules so that only a limited number of clients may be routed to a server running a new version of a service until it is determined that the new version is stable or other criteria are met. In another example, a client is only provided with servers for which the winsql2 service has an "active" status. As another example, role based rules may specify that a user having a "testing" role be provided "active" status access to a beta version of a content server, while non-testing users be provided "dormant" status access to the beta version of the content server until the beta version is fully tested. The broker may be configured to alter the status of the content server for different users based on the rules. In some embodiments, the client (or other application) is responsible for enforcing the controls associated with a particular status.

If a requesting application (e.g., client) is an internal user (e.g., internal to a firewall), the application may be directed to an internal IP address, which, as discussed above may be the address assigned to the runtime container encapsulating the content server or other component providing the service. If, however, the requesting application is an external application (e.g., making requests from locations external to a firewall behind which the broker is located), the application may be provided an external IP address, and the translations from internal IP to external IP, or vice versa, may be handled automatically, without specific IP address conversions being visible to the user.

While FIG. 11B only illustrates a single server for the winsql2 service, the winsql2 service may map to multiple servers (e.g., winsql2 servers hosted at multiple content servers). The client may thus be provided a list of multiple content servers running versions of the winsql2 service. As discussed above, the information at the broker can be continually updated as components are started and stopped or change statuses.

FIG. 12 illustrates an example format of an address map 1050 that may be maintained by a broker, according to some embodiments. The address map maps an internal IP address to an external IP address. For example, if a client (or other application) from inside the firewall requests a server map for a service and the server is at 10.0.0.1, the broker can return 10.0.0.1 as part of the connection address for the server (e.g., in the connection addr field of the server map). However, if the application requesting the server map is external to the firewall, the broker can return an externally accessible IP address for the server, 172.214.1.100 as part of the connection address for the server (e.g., in the connection addr field of the server map). Similarly, internal port numbers may be mapped to external port numbers. For example, using such mappings of internal-external IP addresses, various components may appear to be co-located physically on a same system, when in fact they may be physically hosted on different systems. The network on which the content management system is implemented can be configured to route data from the external IP address/port to the appropriate internal IP address/port.

Figure 13:
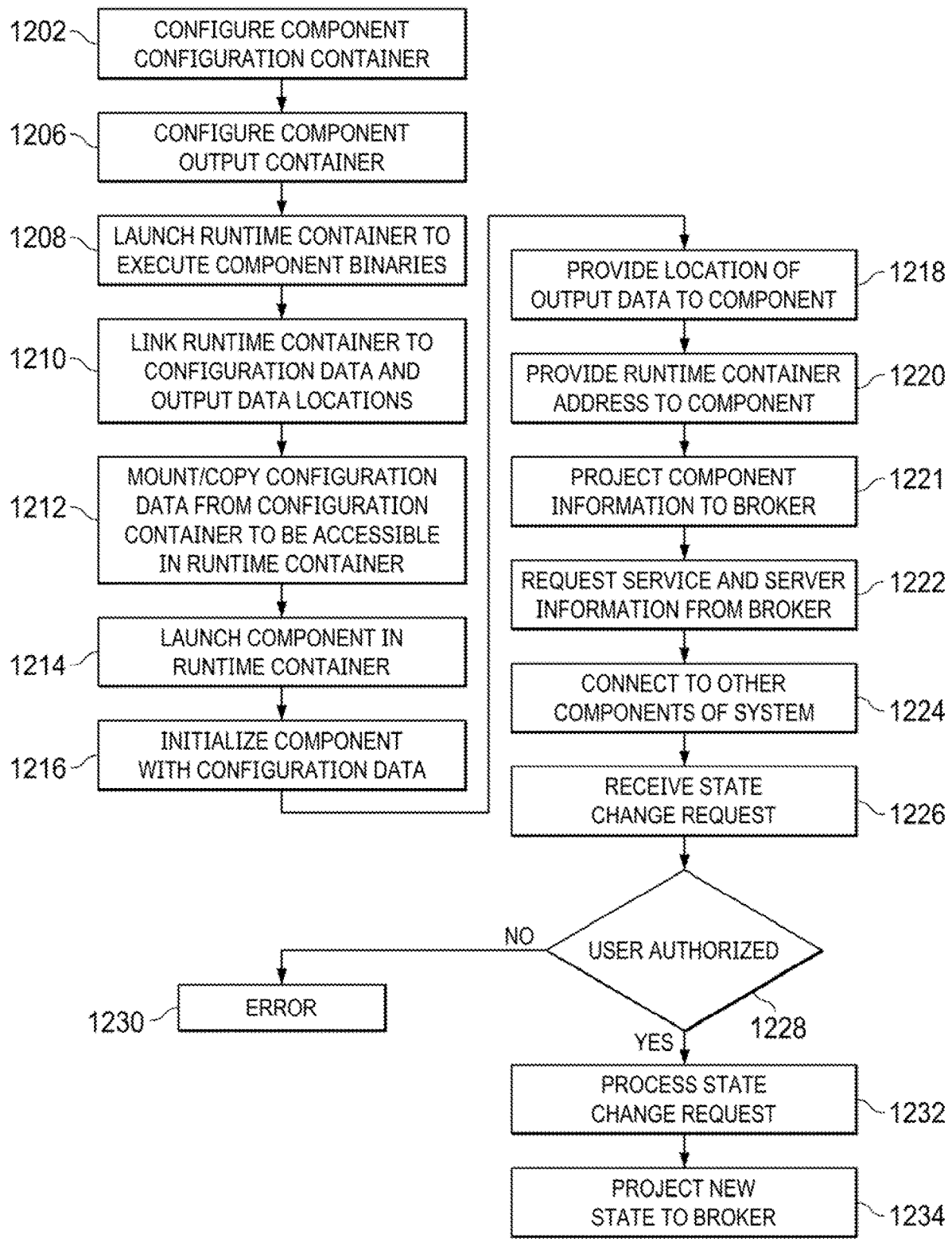
FIG. 13 is a flowchart illustrating operation of an embodiment for stateless content management systems.

FIG. 13 is a flowchart illustrating one embodiment of operation of a stateless content management system. At 1202, a memory of a first container is configured with configuration data. For example, component configuration is stored in a first container. The configuration data may include any configuration information used to configure a component including, for example, initialization information. By way of example, the configuration information may include an indication of a database, connection parameters for the database server, job configuration information, an indication of a file system, connection parameters to connect to the file system, the location of broker, an indication of services and other configuration data. At 1206, the memory of a container is configured to store output data of a component. The container configured as an output data container may be the same container that includes the component configuration data or another container.

At 1208, a component runtime container configured to execute the binaries for a component is launched. For example a stateless binary container containing executable code to provide a version of a component is launched. At 1210, the component runtime container is linked to the locations of the configuration data and the output data for the component. For example, the component runtime container is linked to the container containing the component configuration data and the container configured for the component output. At 1212, the configuration data for the component is made accessible in the runtime container. For example, the runtime container startup process can read the configuration data from the first container and store the configuration data in a config.ini file in a location from which the component is configured to access configuration data. At 1214, the component is launched in the runtime container. The component, at 1216, accesses the configuration data and initializes using the configuration information. The component may also be configured to request various parameters from the runtime environment. At 1218 and 1220, the runtime container provides the location for the component output to the component and the IP address of the runtime container to the component.

At 1221, the component provides its server and service information, including a component status, to the broker indicated in the component configuration information. At 1222, the component requests information on the services indicated in the component configuration information and the servers that provide the services. At 1224, the component connects to other components of the system based on the component configuration information or information provided by the broker. According to one embodiment, the component may connect to a database indicated in the component configuration to determine user rights and other information.

According to one embodiment, the component is launched in dormant mode. At 1226, the component receives a state change request. At 1228, the authorization of the user making the request is tested. If the user is not authorized for this operation, then an error is generated at 1230. If the user is authorized, then at 1232 the component proceeds to process the state change request to change to an active mode. Further, at 1234, the component projects the new active state to the broker.

Figure 14:
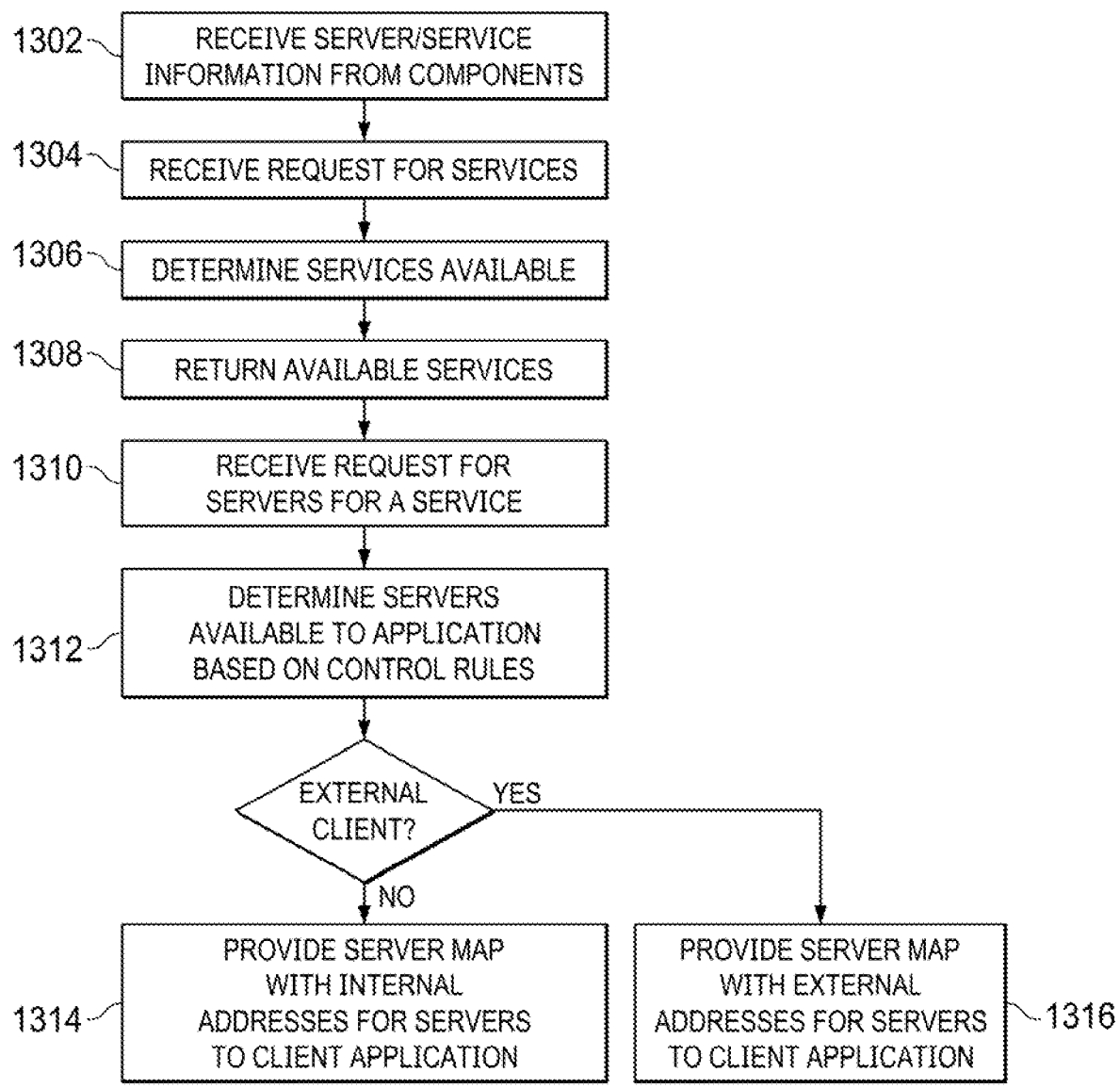
FIG. 14 is a flowchart illustrating another operation of an embodiment for stateless content management systems.

FIG. 14 is a flowchart illustrating operation of an embodiment for providing stateless content management systems. At 1302, a broker receives service and server information projected by components of the content management request. At 1304, the broker receives a request from a component (e.g., a client application, a customer application, a server component) for services of a content management system available to the component. The request may be associated with a user of the content management system.

The broker may be configured with control rules that limit services or servers available based on a role of a requesting user, a geographic location of the requesting user (or of the component), an amount of traffic, the component requesting the services or other factors. At 1306, the broker determines, one or more versions of a service may be determined to be available with regard to the request. At step 1308, the broker returns an indication of the determined available services.

At 1310, the broker may receive a request for available servers for a service. The request may be associated with a user. At 1312, the broker determines, based on the control rules, one or more servers available with regard to the request. A list of servers hosting the one or more versions may be provided to the requesting component. The list may include an IP address and a port number associated with each of the one or more servers. For example, for a request from an internal component, the broker may return a list with internal IP addresses and port numbers for the servers (1314), whereas for a request from an external component, the broker may return a list having addresses and ports that can be used to external components to reference the servers (1316). Each of the servers in the list may be provided by a respective stateless container executing binaries of executable instructions configured to provide functionality of the server.

Figure 15:
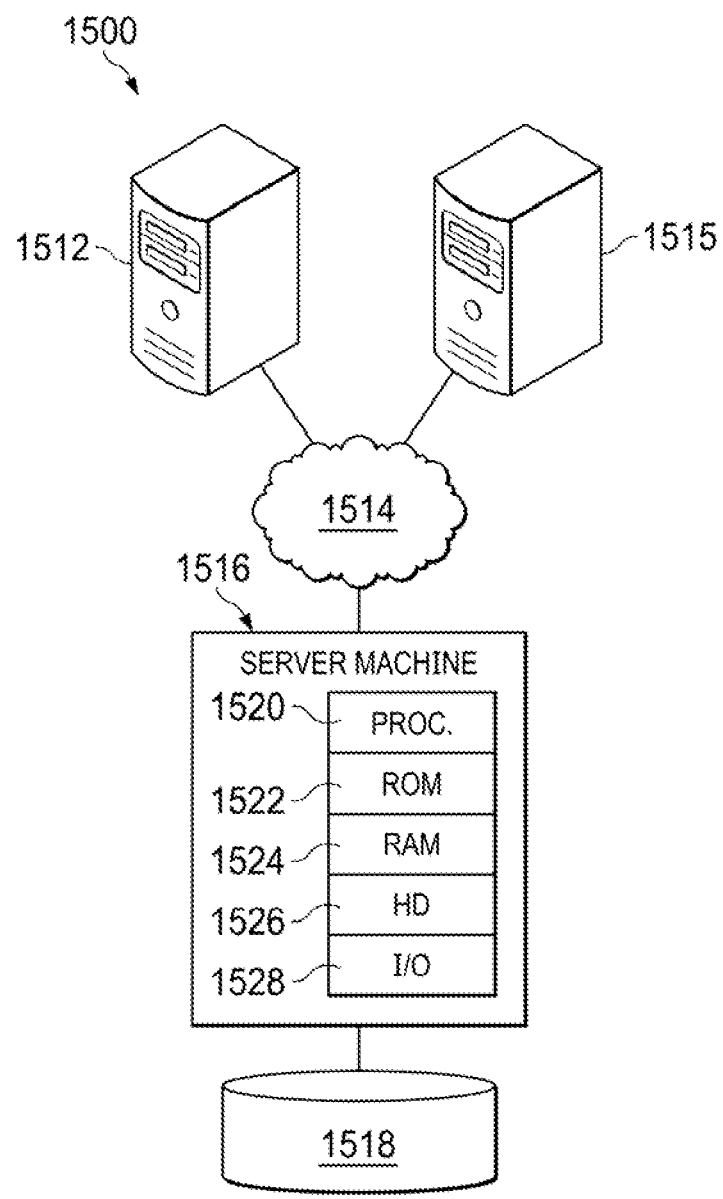
FIG. 15 is a diagrammatic representation of one embodiment of a distributed computing environment.

FIG. 15 is diagrammatic representation of a distributed network computing environment 1500 where embodiments disclosed can be implemented. In the example illustrated, network computing environment 1500 includes network 1514 that can be bi-directionally coupled to first client machine 1512, second client machine 1515 and a content management system server machine 1516. Content management system server machine 1516 can be bi-directionally coupled to a data store 1518 storing a repository comprising a database and a file system. Network 1514 may represent a combination of wired and wireless networks that network computing environment 1500 may utilize for various types of network communications known to those skilled in the art. For the purpose of illustration, a single system is shown for each of first client machine 1512, second client machine 1515 and content management system server machine 1516. However, each of first client machine 1512, second client machine 1515 and content management system server machine 1516 may comprise a plurality of computers (not shown) interconnected to each other over network 1514.

First client machine 1512 and second client machine 1515 may include content management client applications. Content management system server machine 1516 comprises a container framework configured to provide components of a content management system (e.g., one or more containers of environment 100). Content management system server machine 1516 may launch containers to provide the components of the content management system.

Content management system server machine 1516 can include a processor 1520, read-only memory ("ROM") 1522, random access memory ("RAM") 1524, hard drive ("HD") or storage memory 1526, and input/output device(s) ("I/O") 1528. Each of first client machine 1512, second client machine 1515 and content management system server machine 1516 may have more than one processor, ROM, RAM, HD, I/O, or other hardware components. For the sake of brevity, content management system server machine 1516 is illustrated as having one of each of the hardware components, even if more than one is used.

Portions of the methods described herein may be implemented in suitable software code that may reside within ROM; RAM; or HD. Content management system server machine 1516 may include, for example, a set of computer instructions stored on a computer readable medium (e.g., RAM, HD, ROM or other computer readable medium) that are executable by processor 1520 to provide an operating system, a container framework, runtime containers, configuration containers, output containers or other containers. A computer readable medium may include, for example, container images for containers to provide components of a content management system.

According to one embodiment, the container framework may allocate resources, such as memory, of server machine 1516 to containers. A portion of the memory of content management system server machine 1516 can be used as code memory for a runtime container to store instructions executable to provide a functional component of the content management system. Further a portion of the memory of server machine 1516 may be used by a configuration container to store configuration data used by runtime containers. A portion of the memory of server machine 1516 may also be used by a data container for storing configuration data. In some embodiments, the configuration data and output data may be persistently stored to data storage device 1526. A portion of the memory of server machine 1516 may also be used as a mapping memory that stores data for a mapping component (e.g., a broker).

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as LAN, WAN, or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments discussed herein can be implemented in suitable instructions that may reside on a non-transitory computer readable medium, hardware circuitry or the like, or any combination and that may be translatable by one or more server machines. ROM, RAM, and HD are computer memories for storing computer-executable instructions executable by a CPU or other processor or capable of being compiled or interpreted to be executable by the CPU or other processor. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

A "computer-readable medium" may be any medium that can contain or store a program for use by or in connection with the instruction execution system, apparatus, system or device. The computer readable medium can be, by way of example only but not by limitation, an electronic, magnetic, optical, electromagnetic, or semiconductor system, apparatus, system, device or computer memory. Such computer-readable medium shall generally be machine readable and include software programming or code. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise a non-transitory computer readable media storing computer instructions translatable by a processor in a computing environment.

A "processor," unless context dictates otherwise, includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A computer program product comprising a non-transitory, computer-readable storage medium storing computer-executable code comprising:
   code for a first stateless container of binaries, the first stateless container of binaries comprising a code memory having stored thereon code for a first version of a first functional component of a content management system, the first version of the first functional component executable to provide a first version of a service of the content management system;
   code for a broker executable to:
      receive a request for the service of the content management system from a client application, the request associated with a user of the content management system;
      determine a plurality of versions of the service that are accessible with regard to the user, the plurality of versions of the service including the first version of the service, wherein the first version of the service is provided by the first stateless container of binaries;
      provide a list of the plurality of versions of the service to the client application;
      determine a set of available servers that host the plurality of versions of the service, the set of available servers including an available first server that hosts the first version of the service, wherein each of the plurality of versions of the service is provided by a respective stateless container of binaries from a plurality of stateless containers of binaries, the plurality of stateless containers of binaries including the first stateless container of binaries; and
      provide a server list listing the set of available servers to the client application, the server list including an IP address and port number for each of the available servers in the set of available servers.

2. The computer program product of claim 1, wherein the computer-executable code comprises:
   code for the plurality of stateless containers of binaries, wherein each stateless container of binaries from the plurality of stateless containers of binaries comprises code for a different version of the first functional component, each different version of the first functional component executable to provide a different version of the service, wherein the broker is executable to:
      provide the list of the plurality of versions of the service to the client application, the list of the plurality of versions of the service listing the first version of the service, wherein each of the plurality of versions of the service is provided by a respective stateless container of binaries from the plurality of stateless containers of binaries.

3. The computer program product of claim 1, wherein the computer-executable code comprises:
   code for a configuration container, the configuration container executable to provide a configuration memory having stored thereon configuration data; and
   instructions executable to link the first stateless container of binaries to the configuration container.

4. The computer program product of claim 3, wherein the configuration data includes a location of the broker, wherein the first stateless container of binaries is configured to initialize the first version of the first functional component with the configuration data, and wherein the first version of the first functional component is executable to register with the broker based on the configuration data.

5. The computer program product of claim 4, wherein the broker is executable to maintain a service registry for the content management system and wherein the first version of the first functional component is executable to project an operational status to the broker.

6. The computer program product of claim 1, wherein the computer-executable code comprises:
   code to provide a mapping memory having stored thereon:
      mapping data that maps internal IP addresses of the plurality of stateless containers of binaries to corresponding external IP addresses that are accessible to external users of the content management system; and
      status data that indicates a current operational status of each different version of the first functional component, wherein the broker is executable to use the mapping memory to provide an internal IP address for the available first server to the client application based on a determination that the client application is an internal application and provide an external IP address for the available first server to the client application based on a determination that the client application is an external application.

7. The computer program product of claim 6, wherein the mapping memory has stored thereon indicators of access permissions of specified users for accessing different versions of first functional component.

8. The computer program product of claim 7, wherein the indicators of access permissions indicate a first level of access for a first user to the first version the first functional component and a second level of access for the first user to a second version of the first functional component.

9. The computer program product of claim 1, wherein the computer-executable code further comprises:
   code for a data container to run external to the first stateless container of binaries, the data container configured to store output data for the first stateless container of binaries; and
   instructions to link the first stateless container of binaries to the data container.

10. A content management method comprising:
   executing a first version of a first functional component of a content management system in a first stateless container of binaries, the first stateless container of binaries comprising a code memory having stored thereon code for the first version of the first functional component of the content management system, the first functional component providing a first version of a service of the content management system;
   at a broker external to the first stateless container of binaries:
      receiving a request for the service of the content management system from a client application, the request associated with a user of the content management system;
      determining a plurality of versions of the service that are accessible with regard to the user, the plurality of versions of the service including the first version of the service;
      providing a list of the plurality of versions of the service to the client application;
      determining a set of available servers that host the plurality of versions of the service, the set of available servers including an available first server that hosts the first version of the service, wherein each of the plurality of versions of the service is provided by a respective stateless container of binaries from a plurality of stateless containers of binaries, the plurality of stateless containers of binaries including the first stateless container of binaries; and
      providing a server list listing the set of available servers to the client application, the server list including an IP address and port number for each of the available servers in the set of available servers.

11. The content management method of claim 10, comprising:
   running the plurality of stateless containers of binaries;
   executing a different version of the first functional component in each of the plurality of stateless container of binaries, each different version of the first functional component executable to provide a different version of the service;
   providing, by the broker, the list of the plurality of versions of the service to the client application, the list of the plurality of versions of the service listing the first version of the service, wherein each of the plurality of versions of the service is provided by a respective stateless container of binaries from the plurality of stateless containers of binaries.

12. The content management method of claim 10, further comprising:
   running a configuration container, the configuration container comprising a configuration memory having stored thereon configuration data; and
   linking the first stateless container of binaries to the configuration container.

13. The content management method of claim 12, further comprising:
   the first stateless container of binaries initializing the first version of the first functional component with the configuration data, wherein the configuration data includes a location of the broker; and
   the first version of the first functional component registering with the broker based on the configuration data.

14. The content management method of claim 13, further comprising:
   maintaining, by the broker, a service registry for the content management system; and
   projecting, by the first version of the first functional component, an operational status of the first version of the first functional component to the broker.

15. The content management method of claim 10, further comprising:
   providing a mapping memory having stored thereon:
      mapping data that maps internal IP addresses of the plurality of stateless containers of binaries to corresponding external IP addresses that are accessible to external users of the content management system; and
      status data that indicates a current operational status of each different version of the first functional component, wherein the broker is executable to use the mapping memory to provide an internal IP address for the available first server to the client application based on a determination that the client application is an internal application and provide an external IP address for the available first server to the client application based on a determination that the client application is an external application.

16. The content management method of claim 15, wherein the mapping memory has stored thereon indicators of access permissions of specified users for accessing different versions of first functional component.

17. The content management method of claim 16, wherein the indicators of access permissions indicate a first level of access for a first user to the first version the first functional component and a second level of access for the first user to a second version of the first functional component.

18. The content management method of claim 10, further comprising:
   running a data container external to the first stateless container of binaries, the data container configured to store output data for the first stateless container of binaries; and
   linking the first stateless container of binaries to the data container.

19. A content management system comprising:
   a processor;

a first stateless container of binaries, the first stateless container of binaries comprising a code memory having stored thereon code for a first version of a first functional component of a content management system, the first functional component executable to provide a first version of a service of the content management system; and a broker executable to:
receive a request for the service of the content management system from a client application, the request associated with a user of the content management system;
determine a plurality of versions of the service that are accessible with regard to the user, the plurality of versions of the service including the first version of the service, wherein the first version of the service is provided by the first stateless container of binaries;
provide a list of the plurality of versions of the service to the client application;
determine a set of available servers that host the plurality of versions of the service, the set of available servers including an available first server that hosts the first version of the service, wherein each of the plurality of versions of the service is provided by a respective stateless container of binaries from a plurality of stateless containers of binaries, the plurality of stateless containers of binaries including the first stateless container of binaries; and
provide a server list listing the set of available servers to the client application, the server list including an IP address and port number for each of the available servers in the set of available servers.

20. The content management system of claim 19, comprising:
the plurality of stateless containers of binaries, wherein each stateless container of binaries from the plurality of stateless containers of binaries comprises code for a different version of the first functional component, each different version of the first functional component executable to provide a different version of the service, wherein the broker is executable to:
provide the list of the plurality of versions of the service to the client application, the list of the plurality of versions of the service listing the first version of the service, wherein each of the plurality of versions of the service is provided by a respective stateless container of binaries from the plurality of stateless containers of binaries.

21. The content management system of claim 20, further comprising:
a configuration container, the configuration container comprising a configuration memory having stored thereon configuration data, the configuration data including a location of the broker; and
instructions executable to link the first stateless container of binaries with the configuration container, wherein the first stateless container of binaries is executable to initialize the first version of the first functional component with the configuration data, and wherein the first version of the first functional component is executable to register with the broker based on the configuration data and project a status of the first version of the first functional component to the broker.

22. The content management system of claim 21, wherein the broker is executable to maintain a service registry for the content management system.

23. The content management system of claim 19, further comprising:
a mapping memory having stored thereon:
mapping data that maps internal IP addresses of the plurality of stateless containers of binaries to corresponding external IP addresses that are accessible to external users of the content management system; and
status data that indicates a current operational status of each different version of the first functional component, wherein the broker is executable to use the mapping memory to provide an internal IP address for the available first server to the client application based on a determination that the client application is an internal application and provide an external IP address for the available first server to the client application based on a determination that the client application is an external application.

24. The content management system of claim 23, wherein the mapping memory has stored thereon indicators of access permissions of specified users for accessing different versions of first functional component.

* * * * *